United States Patent
De Paolis et al.

(10) Patent No.: US 12,346,388 B2
(45) Date of Patent: Jul. 1, 2025

(54) USER PROFILE MATCHING USING LISTS

(71) Applicant: Lystr LLC, Fort Lauderdale, FL (US)

(72) Inventors: Alessandro De Paolis, Fort Lauderdal, FL (US); Francis Nagle, Hanover, MA (US); Neal Pollard, Westfield, NJ (US)

(73) Assignee: Lystr LLC, Fort Lauderdale, FL (US)

( * ) Notice: Subject to any disclaimer, the term of this patent is extended or adjusted under 35 U.S.C. 154(b) by 168 days.

(21) Appl. No.: 17/527,152

(22) Filed: Nov. 15, 2021

(65) Prior Publication Data

US 2022/0156334 A1 May 19, 2022

Related U.S. Application Data

(60) Provisional application No. 63/114,405, filed on Nov. 16, 2020.

(51) Int. Cl.
*G06F 16/9535* (2019.01)
*G06F 16/951* (2019.01)
*G06F 16/9536* (2019.01)

(52) U.S. Cl.
CPC ........ *G06F 16/9535* (2019.01); *G06F 16/951* (2019.01); *G06F 16/9536* (2019.01)

(58) Field of Classification Search
CPC ............... G06F 16/9535; G06F 16/951; G06F 16/9536; G06Q 50/01
See application file for complete search history.

(56) References Cited

U.S. PATENT DOCUMENTS

| | | | | |
|---|---|---|---|---|
| 8,935,245 | B1 * | 1/2015 | Cionca | G06F 16/248 |
| | | | | 707/758 |
| 10,282,431 | B1 * | 5/2019 | Bhotika | G06F 16/5838 |
| 2009/0154795 | A1 * | 6/2009 | Tan | G06F 16/583 |
| | | | | 382/155 |
| 2014/0351079 | A1 * | 11/2014 | Dong | G06Q 30/0282 |
| | | | | 705/26.7 |
| 2016/0026713 | A1 * | 1/2016 | Katic | G06F 16/28 |
| | | | | 707/723 |
| 2018/0158125 | A1 * | 6/2018 | Perelman | G16H 70/40 |
| 2020/0089711 | A1 * | 3/2020 | Akulov | G06F 16/90348 |
| 2021/0256216 | A1 * | 8/2021 | Downs | G06F 40/186 |
| 2021/0357451 | A1 * | 11/2021 | Wold | G10H 1/0008 |

OTHER PUBLICATIONS

Athanasopoulou, G. et al. "eMatch: An Android Application for Finding Friends in Your Location" Mobile Information Systems, accepted Nov. 25, 2015, 12 pages, vol. 2015, Article ID 463791, Hindawi Publishing Corporation.

* cited by examiner

*Primary Examiner* — Ann J Lo
*Assistant Examiner* — Fatima P Mina
(74) *Attorney, Agent, or Firm* — Lowenstein Sandler LLP

(57) ABSTRACT

Systems and methods for list matching and/or user matching using lists is described. A method includes receiving first data associated with a first user profile including a first set of ranked items and a first title having one or more keywords. The method further includes identifying second data associated with a second user profile including a second set of ranked items and a second title including one or more keywords. The first title and the second title are within are threshold proximity based on the keywords of the first title and the second title. The method further includes determining that the first set of ranked items is most similar to the second set of ranked items by performing a rank-weighted similarity comparison. The method further includes providing a rank-ordered list for presentation on the user device.

14 Claims, 13 Drawing Sheets

USER PROFILE MATCHING USING LISTS

RELATED APPLICATIONS

The present application claims the benefit under 35 U.S.C. § 119(e) of U.S. Provisional Patent Application No. 63/114,405 filed Nov. 16, 2020, which is incorporated by reference herein.

TECHNICAL FIELD

The instant specification generally relates to user profiles, more specifically, matching user profiles with other related user profiles using lists.

BACKGROUND

A user profile may comprise a collection of personal data associated with a specific user, or a customized desktop environment. A user profile may refer to a digital representation of a person's identity. A user profile may store the description of the characteristics of a person. User profiles may be included on operating system, computer programs, recommender systems, dynamic websites (such as online social networking sites or bulletin boards), and the like.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some embodiments, a processing device can be configured to receive a list from a user device and identify other lists similar to the received list. A processing device may receive a set of ranked items (e.g., a list of ranked items) and identify other sets of ranked items (e.g., lists of ranked items) that have similar attributes (e.g., include the same items or same order of items). A processing device may receive a set of user profiles having a first collection of sets of ranked items and identify other user profiles having other collections of set of ranked items that have one or more sets that are similar to one or more sets of the first collection. In an exemplary embodiment, a method, system, and computer readable media (CRM) for list matching and/or user profile matching is disclosed.

In some embodiments, a method, performed by a process device, may include, receiving first data (e.g., associated with a first user profile). The first data may include a first set of ranked items and a first title having one or more keywords. The method further includes identifying second associated with a second user profile. The second data may include a second set of ranked items and a second title having one or more keywords. The method may further include determining that the first title and the second title are within a threshold proximity (e.g., condition) based on a comparison between the one or more keywords of the first title and the one or more keywords of the second title. The method may further include determining that the first set of ranked items is most similar to the second set of ranked items based on a comparison between the first set of ranked items and one or more additional sets of ranked items comprising the second set of ranked items. The method may further include providing the first set of ranked items for presentation on the user device responsive to determining that the first set of ranked items is most similar to the second set of ranked items.

In an exemplary embodiments, a method includes receiving, by a processing device from a user device, first data associated with a first user profile. The first data may include a first collection rank-ordered set each comprising an associated title. The method may further include the processing device identifying second data associated with a second user profile. The second data may include a second collection of rank-ordered sets each comprising an associated title. The first collection and the second collection may be within a threshold proximity based on a similarity between the one or more title associated with the sets of the first collection and the one or more title associated with the sets of the second collection. The method may further include providing, by the processing device, the second user profile for presentation on the user device responsive to determining that the first user profile is most similar to the second user profile.

In an exemplary embodiments, a non-transitory machine-readable storage medium includes instruction that, when executed by a processing device, cause the processing device to perform the following features. The processing device may receive, from a user device, first data associated with a first user profile. The first data may include a first set of ranked items and a first title having one or more keywords. The processing device may identify second data associated with a second user profile. The second data may include a second set of ranked items and a second title having one or more keywords. The processing device may determine that the first title and the second title are within a threshold proximity based on a comparison between the one or more keywords of the first title and the one or more keywords of the second title. The processing device may further determine that the first set of ranked items is most similar to the second set of ranked items based on a comparison between the first set of ranked items and one or more additional sets of ranked items comprising the second set of ranked items. The processing device may further provide the first set of ranked items for presentation on the user device responsive to determining that the first set of ranked items is most similar to the second set of ranked items.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
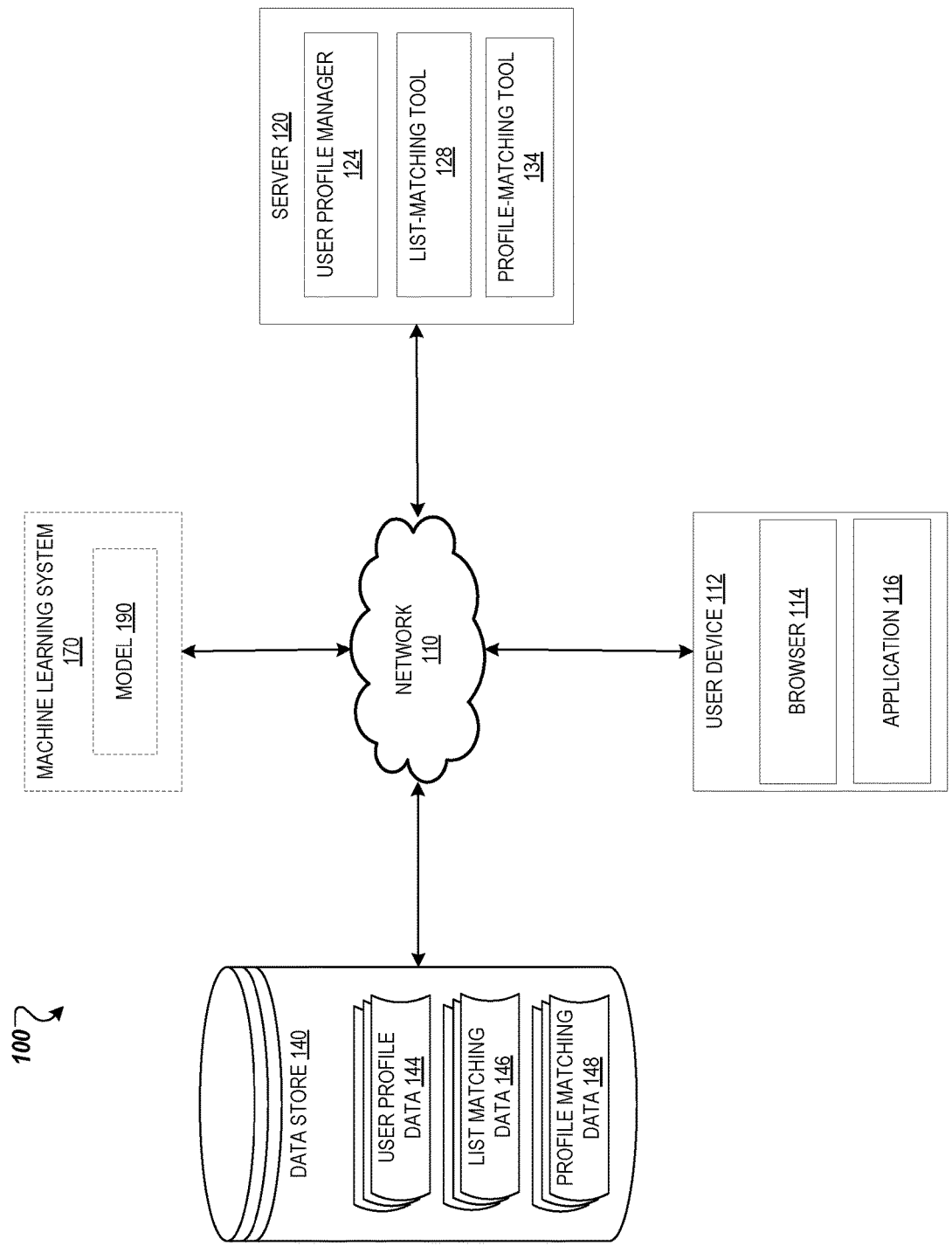
FIG. 1 is a block diagram illustrating an exemplary system architecture in which implementation of the disclosure may operate.

A user profile often includes a collection of settings and/or information associated with a user. A user profile may include identifying information of an individual associated with the user profile such as name, age, picture and/or individual characteristic such as knowledge or expertise. User profiles can be used in association with interactive technologies that allow the creation and/or sharing/exchanging of information, ideas, interests, and other forms of expression via virtual communities and/or networks sometimes referred to as social media and/or social network applications. In personal computing and operating system, user profiles can serve to categorize files, settings, and documents by individual user environments, sometimes referred to as 'accounts', allowing the operating system to be organized.

Conventional networking application, such as social media applications, often help users communicate and/or otherwise connect with other users. For example, social networking applications sometimes attempt to match user based on some measured or determined compatibility metric corresponding to one or more elements of each of the user profiles. As mentioned previously, a user profile may include copious amounts of user profile data including demographic information, communication information (e.g., telephone, electronic mail address, messaging alias, and the like), and information on personal interests of the user, and other information corresponding to the user.

Conventional networking systems may also, with input from a user, create and store a record of relationships of the user with other users of the social-networking system. However, identifying links between user profile data and other user profile data as well as connecting users with other users can prove difficult using conventional networking systems (e.g., due to the sheer quantity of data associated with each user and the quantity of users associated with a networking system). Some conventional networking systems have attempted to request pre-defined categories of information from users to ascertain the links between user and user profile data. However, each user may be different and have diverse interests that are not accurately represented in pre-defined categories of information. Additionally, some pre-defined categories may requesting information too generally that does not accurately represent the interest of a user associated with the user profile.

Aspects and implementations of the present disclosure address these and other shortcoming of existing technology by providing methods and systems for matching lists and/or user profiles. A new method is proposed (e.g., to tackle the above-mentioned limitations) wherein users may create lists corresponding to a custom category and match lists and/or user profiles with other users using the customized lists. A list may include a title with keywords associated with the subject matter or category of the list and a sentiment (e.g., "best," "top", "worst", etc.) towards the subject matter. For example, a list may be entitled "best sports" or "worst movies." In some embodiments, the new method permits customized lists that further narrow a generalized category. For example, a list may include "best music of the 80*s*" or other subcategory to commonly generalized categories. The method may allow users to generate multiple lists within the same generalized category. For example, a user may create a first list entitled "best action movies" and another list "best sports movies." The present disclosure may allow for greater granularity and customization over conventional networking systems and/or methods by providing a matching method compatible with user customized lists.

Additionally, the new method may receive lists (e.g., customized lists previously described) from users and match list with other similar lists. The disclosed method may include matching a customized list created by a first user with a customized list created by a second user. The method may include a title comparison to determine similar (e.g., within a similarity threshold) subject matter and a common sentiment (e.g., "top", "best", "worst", etc.). The method further includes identifying similar lists by comparing the elements (e.g., rank-ordered elements) of each list to find similarities and in some embodiments determining a similarity metric to be used in identifying similar lists. The method may further leverage list matching (e.g., as described herein) to identify user profiles that are similar to a current user. For example, by comparing collections of lists of both user profiles and determining that the current user and a target user meet similarity criteria as will be described herein.

In the following description, numerous details are set forth. A processing device may use the methods and systems disclosed herein. For example, an operating system, computer programs, recommender systems, dynamic websites (e.g. online social networking sites or bulletin boards), and the like may perform or comprise instructions to perform the disclosed functionality. In some embodiments, a processing device can be configured to receive a list from a user device and identify other lists similar to the received list. A processing device may receive a set of ranked items (e.g., a list of ranked items) and identify other sets of ranked items (e.g., lists of ranked items) that have similar attributes (e.g., include the same items or same order of items).

In an exemplary embodiment, a method, system, and computer readable media (CRM) for list matching and/or user profile matching is disclosed. In some embodiments, a method, performed by a process device, may include, receiving first data associated with a first user profile. The first data may include a first set of ranked items and a first title having one or more keywords. The method further includes identifying second associated with a second user profile. The second data may include a second set of ranked items and a second title having one or more keywords. The method may further include determining that the first title and the second title are within a threshold proximity based on a comparison between the one or more keywords of the first title and the one or more keywords of the second title. The method may further include determining that the first set of ranked items is most similar to the second set of ranked items based on a comparison between the first set of ranked items and one or more additional sets of ranked items comprising the second set of ranked items. The method may further include providing the first set of ranked items for presentation on the user device responsive to determining that the first set of ranked items is most similar to the second set of ranked items.

In an exemplary embodiments, a method includes receiving, by a processing device from a user device, first data associated with a first user profile. The first data may include a first collection rank-ordered set each comprising an associated title. The method may further include the processing device identifying second data associated with a second user profile. The second data may include a second collection of rank-ordered sets each comprising an associated title. The first collection and the second collection may be within a threshold proximity based on a similarity between the one or more title associated with the sets of the first collection and the one or more title associated with the sets of the second collection. The method may further include providing, by the processing device, the second user profile for presentation on the user device responsive to determining that the first user profile is most similar to the second user profile.

In an exemplary embodiments, a non-transitory machine-readable storage medium includes instruction that, when executed by a processing device, cause the processing device to perform the following features. The processing device may receive, from a user device, first data associated with a first user profile. The first data may include a first set of ranked items and a first title having one or more keywords. The processing device may identify second data associated with a second user profile. The second data may include a second set of ranked items and a second title having one or more keywords. The processing device may determine that the first title and the second title are within a threshold proximity based on a comparison between the one or more keywords of the first title and the one or more keywords of the second title. The processing device may further determine that the first set of ranked items is most similar to the second set of ranked items based on a comparison between the first set of ranked items and one or more additional sets of ranked items comprising the second set of ranked items. The processing device may further provide the first set of ranked items for presentation on the user device responsive to determining that the first set of ranked items is most similar to the second set of ranked items.

FIG. 1 is a block diagram illustrating an exemplary system architecture 100 in which implementation of the disclosure may operate. As shown in FIG. 1, system architecture 100 includes user device 112, a server 120, and a data store 140, and optionally includes machine learning system 170. Each of user device 112, the server 120, the data store 140, and the machine learning system 170 may be part of or partially integrated into any of the user device 112, the server 120, and the data store 140, where appropriate. In some embodiments, one or more components of the data store 140, user device 112, machine learning system 170 and/or server 120 can be hosted by one or more computing device including server computers, desktop computers, laptop computers, tablet computers, notebook computers, personal digital assistants (PDAs), mobile communication devices, cell phones, hand-held computers, or similar computing devices.

The data store 140, user device 112, machine learning system 170 and/or server 120 may be coupled to each other via a network 110 (e.g., for performing methodology described herein). In some embodiments, network 110 is a private network that provides each element of system architecture 100 with access to each other and other privately available computing devices. Network 110 may include one or more wide area networks (WANs), local area networks (LANs), wired network (e.g., Ethernet network), wireless networks (e.g., an 802.11 network or a Wi-Fi network), cellular network (e.g., a Long Term Evolution (LTE) network), routers, hubs, switches, server computers, and/or any combination thereof. Alternatively or additionally, any of the elements of the system architecture 100 can be integrated together or otherwise coupled without the use of network 110.

The user device 112 may be or include any personal computers (PCs), laptops, mobile phones, tablet computers, netbook computers, network connected televisions ("smart TV"), network-connected media players (e.g., Blue-ray player), a set-top-box, over-the-top (OOT) streaming devices, operator boxes, etc. The user device 112 may include a browser 114, an application 116, and/or other tools as described and performed by other systems of the system architecture 100. In some embodiments, the user device 112 may be capable of accessing the data store 140 and/or server 120 and communicating (e.g., transmitting and/or receiving) any of user profile data 144, list matching data 146, profile matching data 148, data associated with list-matching tool (e.g., inputs and/or outputs), data associated with profile-matching tool 134), and/or data associated with machine learning system 170 at various stages of processing of the system architecture 100, as described herein.

Data store 140 may be a memory (e.g., random access memory), a drive (e.g., a hard drive, a flash drive), a database system, or another type of component or device capable of storing data. Data store 140 may store one or more of user profile data 144, list matching data 146, and/or profile matching data 148. In some embodiments, one or more of the user profile data 144, list matching data 146, and/or profile matching data 148 may be in association with list-matching tool 128 and/or profile-matching tool 134 to perform one or more functions described herein (See e.g., FIGS. 3 and/or 4 for exemplary methodology).

The user profile data 144 may include data associated with one or more user profiles such as personal identifying information, geographic location, interests, etc. The user profile data 144 may further include one or more sets (e.g., sometimes referred to herein as "lists" and/or "lysts") of ranked items (e.g., rank-ordered lists). As discussed herein, the user profile may be connected or otherwise linked to other user profile and/or other lists associated with other user profiles. In some embodiments, user profiles may be matched and/or linked with other profiles. In some embodiments, individual user profile lists may be matched and/or linked with other lists (e.g., associated with other user accounts).

The list matching data 146 may include data leveraged by list-matching tool 128 to identify lists similar to a current list (e.g., list matching). The list matching data 146 may include a current list and a selection of other list (e.g., pertaining to other users) to use in comparison to determine one or more lists within a threshold similarity. In some embodiments, the list matching data 146 may include dictionary data associated with the meaning of keywords of list titles. For example, the list matching data 146 may include a dictionary database that connect keywords with similar meaning. For example, the dictionary database may indicate a connection between the words "sports" and "athletics." In another example, the dictionary database may indicate a connection between the words "video" and "movie", and so on. In some embodiments, the list matching data 146 include list similarity data. The list similarity data may include one or more similarity metrics associated with a similarity between two or more lists.

The profile matching data 148 may include data leveraged by profile-matching tool 134. The profile matching data 148 may include a collection of lists for a current user and a collection of lists from a multitude of user profiles to use in a comparison (e.g., to determine one or more user profiles being within a threshold similarity and/or most similar to a current user profile). In some embodiments, the profile matching data 148 may store individual user similarity metrics and/or list similarity metrics associated with one or more user profiles. The similarity metrics may indicate a similarity rating between user profiles and individual lists associated with the user profiles.

Server 120 may include one or more computing devices such as a rackmount server, a router computer, a server computer, a personal computer, a mainframe computer, a laptop computer, a tablet computer, a desktop computer, etc. The server 120 can include a user profile manager 124, a list-matching tool 128, and a profile-matching tool 134.

The user profile manager 124 manages user profiles. The user profile manager 124 may include functions such as user profile setup, updating information associated with a user profile, creating of a new list, editing a previously created list, requesting performance of one or more matching methodologies (e.g., functionality associated with list-matching tool 128 and/or profile-matching tool 134). The user profile manager 124 facilitates a user creating a selection of lists (e.g., from other users). For example, the user profile manager 124 may receive inputs from a user to create a list associated with the user, follow or otherwise track a list created by another user, like or otherwise express interest in a list, and so on.

The list-matching tool 128 obtains a current list (e.g., received as input from user device 112) including a set of ranked (e.g., rank-ordered) items. The list-matching tool 128 determines if a list includes a positive or negative sentiment ("top", "best", "worst", etc.) by using a dictionary-based sentiment analysis on a title associated with the list (e.g., determining words like top/best/most favorite, etc. v. words like worst/least favorite). The list-matching tool searches (e.g., using the sentiment) all existing lists (e.g., of server 120 and/or data store 140) for list titles with a similar sentiment (e.g., user perception or mood regarding the items in the list such as "top," "best," "worst," and the like) and similar keywords (e.g., "Top 10 Romance Novels" may be similar to "Top 5 Favorite Romance Books"). The identified lists with similar sentiments and similar titles, are processed to determine a similarity between the content and order of the element in each list. The list-matching tool 128 may leverage a rank-based comparison algorithm (e.g., cosine similarity) to determine a similarity of the current list with each of the list identified as having a similar sentiment and title. The list-matching tool 128 may output the similar lists starting with the list most similar to through the list least similar. The list-matching tool 128 may include one or details, aspects, and/or further illustrated and described in association with FIG. 3.

The profile-matching tool 134 obtains a current user profile (e.g., received as input from user device 112). The profile-matching tool 134 obtains one or more lists associated with the current user profile and performs a search to identify similar list titles (e.g., using one or more features and/or methods associated with list-matching tool 128). The profile-matching tool 134 may aggregate all resulting lists identified as similar to one or more lists of the current user profile. In some embodiments, the profile-matching tool 134 may use all the lists, however, in other embodiments, only a portion of the lists may be used. The profile-matching tool 134 determines a count of the number of lists each user has in common with the current user. For each list of each identified user, the profile-matching tool 134 compares the similarity of the items in each list using a rank-based similarity comparison (e.g., cosine similarity) to obtain a set similarity metric between each list. Set similarity metrics may be aggregated for a given user comparison combination to determine a user to user similarity metric (e.g., sometime referred to as a "MatchMeasure"). The profile-matching tool 134 may return or otherwise output a list of user profiles ordered based on the user-to-user similarity metric (e.g., most similar to least similar).

It should be noted that the term "list" is used as an example, and aspects of the present disclosure can be used with any other type of data structure or data collection. In addition, the term "item" as used herein can refer to a name or an identifier of any object, concept, category, and so on. In some embodiments, a matching system uses rank-ordered lists (e.g., to allow for a granular understanding of preferences in a specific category). The system may allow a user to generate and store multiple lists in the same category. For example, a user profile may be associated with a list entitled "Top 10 Romance Movies" as well as be associated with another list entitled, "Top 5 Horror Movies."

Some embodiments of list-matching tool 128 and/or profile-matching tool 134 may perform their described methodology using a machine learning model. The associated machine learning models may be generated (e.g., trained, validated, and/or tested) using machine learning system 170. The machine learning system 170 may include one or more computing devices such as a rackmount server, a router computer, a server computer, a personal computer, a mainframe computer, a laptop computer, a tablet computer, a desktop computer, etc. The machine learning system 170 may train a model 190 for performing one or more of the methods described in association with list-matching tool 128 and/or profile-matching tool 134.

In some embodiments, the machine learning model 190 may be trained using historical data (e.g., selections of user profile data 144, list matching data 146, and/or profile matching data 148) and/or one or more outputs of list-matching tool 128 and/or profile-matching tool 134. For example, the model 190 may be a hybrid machine learning model using learned modeling and/or statistical modeling.

In some embodiments, user profile data 144, list matching data 146, and/or profile matching data 148 can be processed using a statistical model. A statistical model may be used to process the data based on statistical operations to validate and/or predict matching outcomes based on prior statistical data. For example, the statistical model may employ univariate and/or multivariate data analysis corresponding to individual lists of ranked elements and user profiles. For example, various parameter can be analyzed using the statistical model to determine patterns and correlations through statistical processes (e.g., range, minimum, maximum, quartiles, variance, standard deviation, and so on). In another example, relationships between multiple variables (e.g., title similarity thresholds, list similarity metrics, user profile similarity metric, sentiment classifications, etc.) can be ascertained using regression analysis, path analysis, factor analysis, multivariate statistical process control (MCSPC) and/or multivariate analysis of variance (MANOVA).

In some embodiments, training data (e.g., selections of user profile data 144, list matching data 146, and/or profile matching data) is provided to train the model 190 (e.g., trained machine learning model) to receive a new list with a new title and determine other similar lists and/or other similar users to a new user associated with the new list. For example, the model may perform actions (e.g., or analogous) described in methods 300 and 400.

The model 190 may refer to the model that is created by using a training set that includes data inputs (e.g., rank ordered lists and/or user profiles) and corresponding target output (e.g., similar lists and/or user profiles). Patterns in the data sets can be found that map the data input to the target output (e.g. identifying connections between sentiments and keywords of a list titles and commonly identified ranked elements within those lists), and model 190 is provided mappings that captures these patterns. Model 190 may use one or more of logistic regression, syntax analysis, decision tree, or support vector machine (SVM). The model may be composed of a single level of linear of non-linear operations (e.g., SVM) and/or may be a neural network.

In some embodiments, the functions of user devices 112, server 120, data store 140, and machine learning system 170 may be provided by a fewer number of machines than shown in FIG. 1. For example, in some embodiments, machine learning system may be performed on user device 112 and/or server 120. In general, functions described in one embodiment as being performed by user device 112, data store 140, and/or user device system 170 can also be performed on server 120 in other embodiments, if appropriate. In addition, the functionality attributed to a particular component can be performed by different or multiple components operating together.

In embodiments, a "user" may be represented as a single individual. However, other embodiments of the disclosure encompass a "user" being an entity controlled by multiple users and/or an automated source. For example, a set of individual users federated as a group of administrators may be considered a "user."

Figure 2:
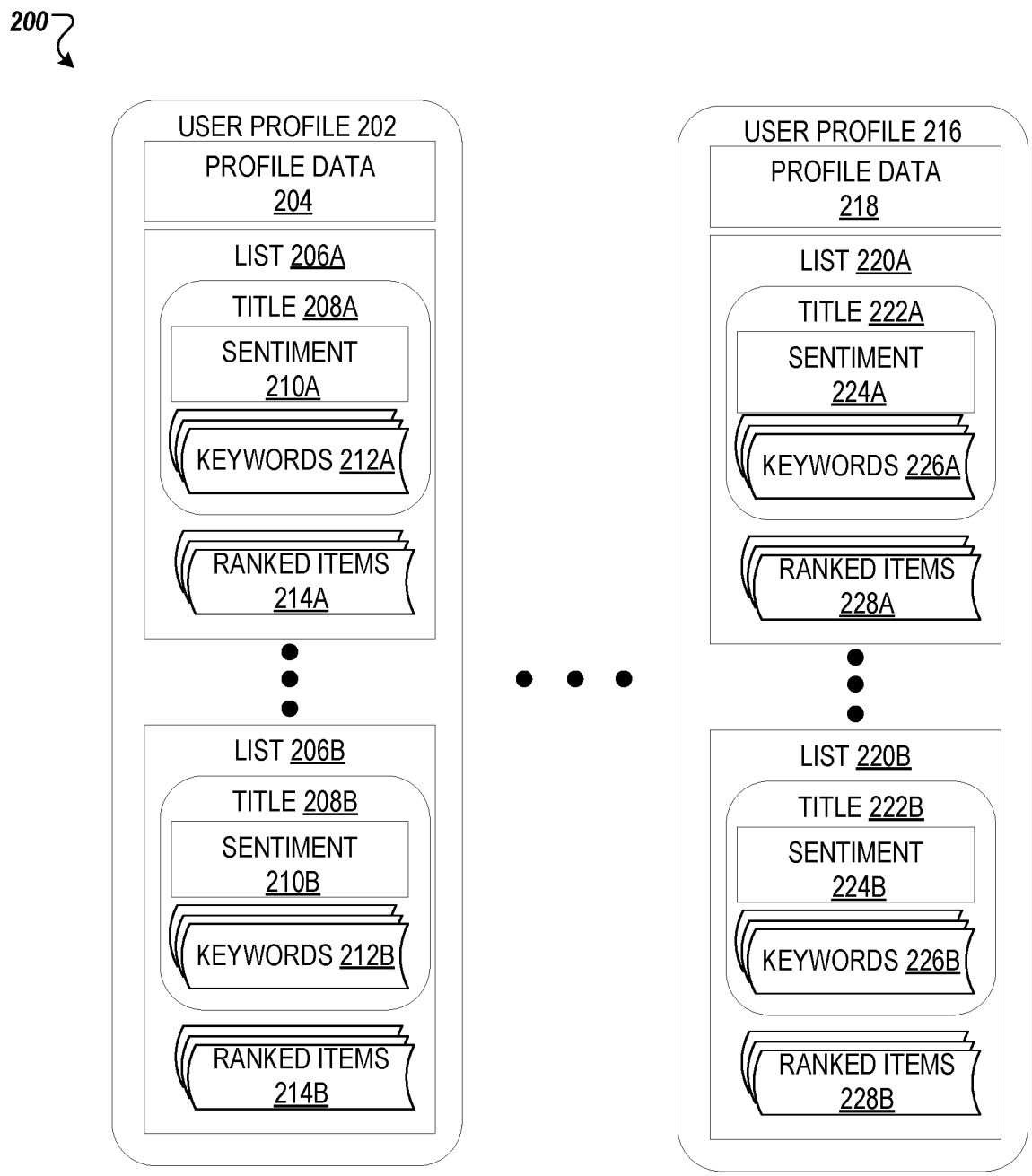
FIG. 2 is a block diagram of a user matching system, according to some embodiments.

FIG. 2 is a block diagram of a user matching system 200, according to some embodiments. As shown in FIG. 2, the user matching system 200 includes one or more user profiles 202, 216. Each user profile may include profile data 204, 218. Profile data 204, 218 may include a collection of settings and information associated with a user. Profile data 204, 218 may include identifying information of an individual associated with the user profile such as name, age, picture and/or individual characteristic such as knowledge or expertise. User profile 202, 216 can be used in association with interactive technologies that allow the creation or sharing/exchanging of information, ideas, interests, and other forms of expression via virtual communities and networks sometime referred to as social media applications. In personal computing and operating system, user profiles 202, 216 can serve to categorize files, settings, and documents by individual user environments, sometime referred to as 'accounts', allowing the operating system to be organized.

As shown in FIG. 2, user profile 202 includes one or more lists 206A-B. The one or more lists 206A-B include titles 210A-B and ranked items 214A-B. The titles 200A-B indicate sentiments 210B and keywords 212A-B indicating an attitude and subject matter (e.g., a category), of an associated list, respectively. The ranked items 214A-B may include a list or other stored medium for characterizing a selection or set of items that include data (e.g., data structuring, data ordering, ranking indicators, etc.) that indicate a priority or rank to individual items of the set of ranked items 214A-B. As shown in FIG. 2, the user matching system 200 may include many user profiles 202, 216 one of which may be the basis for comparison. For example, a first user profile (e.g., user profile 202) may be the received user profile and is compared against a selection of user profiles (e.g., including user profile 216) to identify user profiles meeting similarity criteria as described herein.

Figure 3:
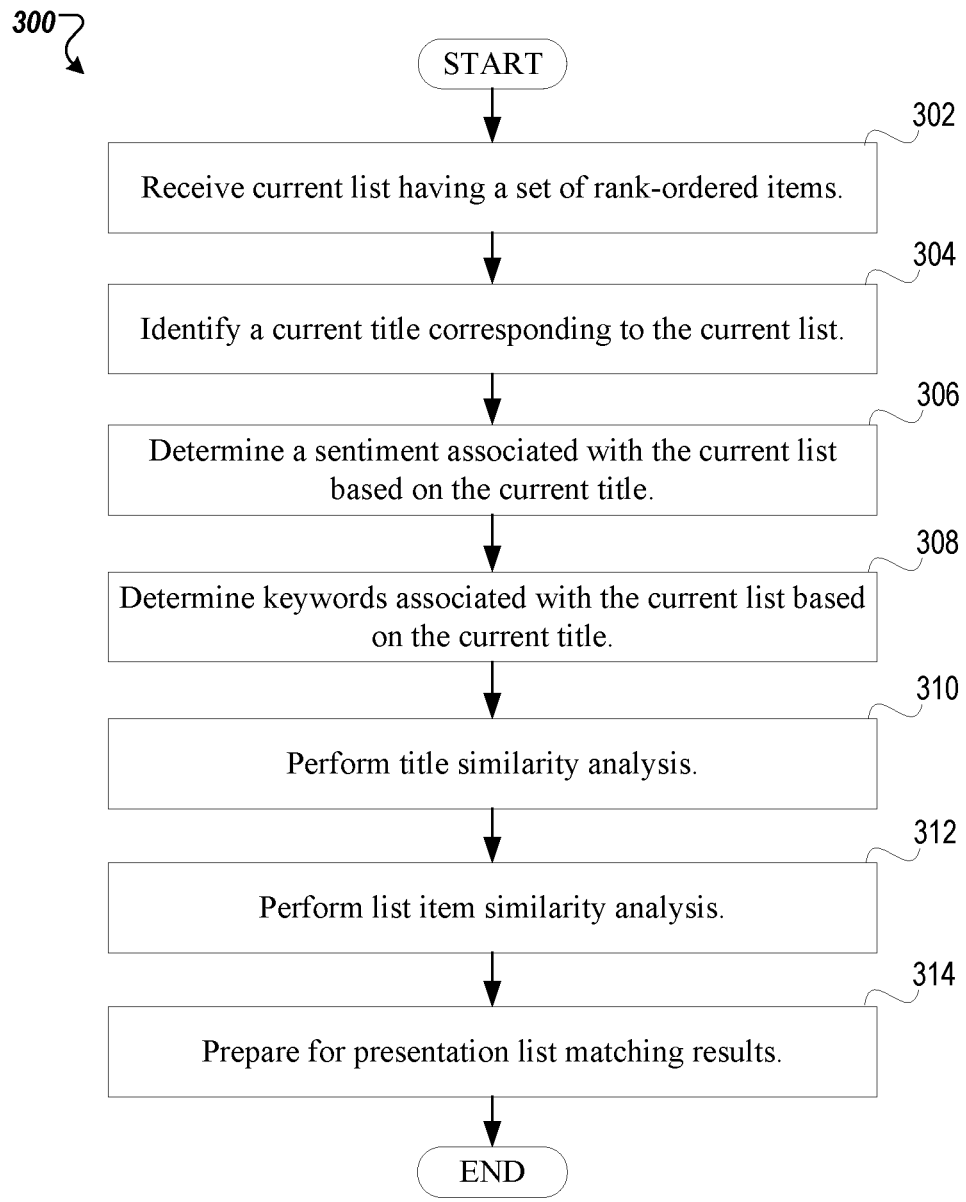
FIG. 3 depicts a flow diagram of one illustrative example of a method of matching lists, according to some embodiments.

FIG. 3 depicts a flow diagram of one illustrative example of a method 300 of matching lists, according to some embodiments. Method 300 is performed by processing logic that can include hardware (circuitry, dedicated logic, etc.), software (such as is run on a general purpose computer system or a dedicated machine), firmware, or some combination thereof. In one implementation, method 300 can be performed by a computer system, such as computer system architecture 100 of FIG. 1. In other or similar implementations, one or more operations of method 300 can be performed by one or more other machines not depicted in the figures.

At block 302, processing logic receives a current list having a set of rank-ordered items. The current list may be associated with a user profile. The current list may include any natural number quantity of items (e.g., 5 items, 10 items, 15 items, etc.). The list may be associated with a category of subject matter (e.g., sports, movies, famous people, hobbies, interests, etc.). The list may include a title having a title and a sentiment. At block 304, processing logic identifies a current title corresponding to the current list. The current list may include a current title having one or more keywords and sentiment.

At block 306, processing logic determines a sentiment associated with the current list based on the current title. The sentiment is associated with an attitude and/or perspective towards the subject matter associated with the items in the list. For example, some sentiments may include "best," "worst", "most," "least", and so on. In some embodiments, processing logic categorizes the sentiment into a sentiment classification. A sentiment classification may include a group of sentiments expressing a common perspective towards the corresponding list items. For example, processing logic may classify each sentiment as a positive sentiment (e.g., "best", "greatest", "most", etc.) and/or a negative sentiment (e.g., "worst", "least", "lowest," etc.). In some embodiments, sentiment classifications may be subject matter specific, determined based on a neutral keyword, and/or determine by the absence of an explicit keyword indicating a sentiment. For example, a title may include "movies to watch in 2021" may not include a keyword sentiment. Processing logic, however, may otherwise determine a positive sentiment based on the absence of a keyword indicating a negative sentiment.

At block 308, processing logic determines keywords associated with the current list based on the current title. Keywords may include one or more words that provide context to the subject matter of the list. Processing logic may extract the terms in the current title and generate a glossary to encapsulate the terms and terms of other lists to be used in a comparison (e.g., to perform title similarity analysis in block 310). Processing logic may perform linguistic filtering to identify keywords from the title by searching for words and phrases that fit certain patterns, such as a noun pattern, an adjective and noun pattern, a gerund and noun pattern, and/or a noun and noun pattern, etc.

At block 310, processing logic performs a title similarity analysis. Processing logic may perform the title similarity analysis by using a term-by-term comparison of the terms extracted from the current title and terms extracted from titles of other lists. In some embodiments, for each term extracted from the current title processing logic will look for identical terms in other titles of other lists. Processing logic may further leverage near-identical terms for each term of the processing logic. For example, processing logic may identify near-identical terms such as "TV" and "Television."

Alternatively or in addition, processing logic may perform a title similarity analysis using a thematic approach. For the thematic approach, processing logic may classify, one or more terms of the current title and terms from the other titles into one or more classes. Processing logic may determine the classes of the terms based on matching and/or comparing each of the terms to a term associated with a subject area. Alternatively or in addition, processing logic may automatically classify the terms based on machine learning clustering that maximizes a distance between clusters of the terms. Once the terms have been clustered, the processing device may assign an identifier to the clusters, such as a number, and each of the terms may be assigned the identifier of the cluster to which it belongs. Lists having terms assigned the same identifier (e.g., of the same subject matter) can meet a similarity threshold associated with the keywords of the title.

At block 312, processing logic performs a list item similarity analysis. The list item similarity analysis may include a rank-ordered similarity analysis. Processing logic may generate a list vector that includes each item of the current list and each item of other lists associated with one or more other users. Processing logic may determine the proximity or similarity between a first list (e.g., first feature vector) and a second list (e.g., second feature vector) using the following calculation for cosine similarity between two vectors (e.g., two lists):

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

where A may be a first vector associated with a first list (e.g., the current list) and each of the other vectors (e.g., representing other lists) being compared may be represented by B, and where $A_i$ and $B_i$ are the items of the vectors A and B (e.g., the items of the lists), respectively. Processing logic may exclude lists having title that are not within a threshold similarity (e.g., using methodology described in association with block 310). In some embodiments, the processing logic may employ a linear distancing evaluation that uses the same distance between each element. For example, a rank 1 to rank 1 match is distance 0, a rank 1 to rank 2 match is a distance 1, and so on. Processing logic may leverage a matching metric that indicates a better match the lower the values associated with the matching metric. In some embodiments, other distancing evaluations may be employed such as a quadratic distance (e.g., squared distance). For example, a rank 1 to rank 1 match is distance 0, a rank 1 to rank 2 match is a distance 1, a rank 1 to rank 3 match is 4, a rank 1 to rank 4 match is 9, and so on.

In some embodiments, processing logic performs a rank weighted similarity analysis (e.g., cosine similarity) between the current list and other lists with title within a threshold similarity. Processing logic may use a weighting system to account for the rank. For example, if three lists (1, 2, 3) have the same four items in them (A, B, C, D), but in different orders, the similarity to each list may be different. For example, a first list may comprise "A, B, C, D," a second list may comprise "B, A, C, D," and a third list may comprise "D, C, B, A." Thus, according to some embodiments, if List 1 was the list being matched, List 2 may be a better match than List 3 since the ordering of List 2 is more similar to List 1, even though all three lists comprise the same items. In some embodiments, the processing logic identifies a similarity metric that indicates an overall similarity between the current list and another associated list.

At block 314, processing logic prepares for presentation list matching results. In some embodiments, processing logic provides an indication of the list determined to be the most similar. In some embodiments, the user profile associated with the list determined to be most similar is displayed. In some embodiments, processing logic, provides a rank-ordered list for presentation on the user device. The rank-ordered list may comprise the sets of ranked items such that a second set of ranked items determined to be the most similar is ranked above all other sets of ranked items. In some embodiments, the rank-ordered list is presented to the user in rank order using a similarity metric. In some embodiments, the lists are presented to the user with a visual indicator representing the similarity metric associated with each list. For example, one or more lists with the highest similarity metric may be depicted with a first color (e.g., green or gold) and one or more lists with a similarity metrics close to a first threshold level may be depicted with a second color (e.g., yellow or silver). In some embodiments, the lists may be placed in tiers or groups based on the associated confidence levels.

Figure 4:
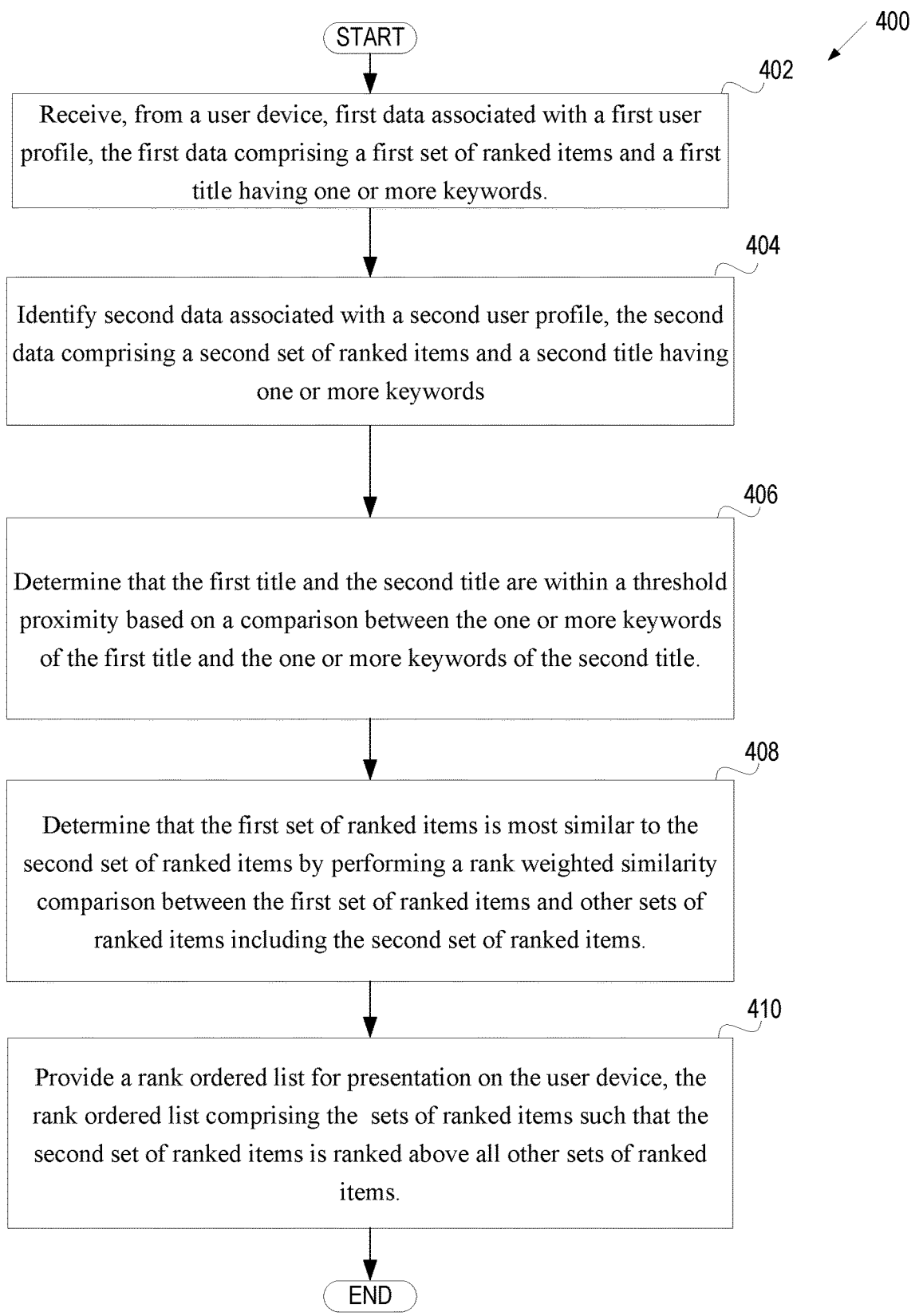
FIG. 4 depicts a flow diagram of one illustrative example of a method of matching lists, according to some embodiments.

FIG. 4 depicts a flow diagram of one illustrative example of a method 400 of matching lists, according to some embodiments. Method 400 is performed by processing logic that can include hardware (circuitry, dedicated logic, etc.), software (such as is run on a general purpose computer system or a dedicated machine), firmware, or some combination thereof. In one implementation, method 400 can be performed by a computer system, such as computer system architecture 100 of FIG. 1. In other or similar implementations, one or more operations of method 400 can be performed by one or more other machines not depicted in the figures.

At block 402, processing logic receives, from a user device, first data associated with a first user profile, the first data comprising a first set of ranked items and a first title including one or more keywords. At block 404, processing logic identifies second data associated with a second user profile, the second data comprising a second set of ranked items and a second title having one or more keywords.

At block 406, processing logic identifies that the first title and the second title are within a threshold proximity based on a comparison between the one or more keywords of the first title and the one or more keywords of the second title. Processing logic may perform a title similarity analysis by using a term-by-term comparison of keywords from the first title and keywords from the second title. In some embodiments, for each keyword from the current title processing logic will look for identical keywords in other titles such as the second title. Processing logic may further leverage near-identical terms for each term of the processing logic. For example, processing logic may identify near-identical terms such as "TV" and "Television."

Alternatively or in addition, processing logic may perform a title similarity analysis using a thematic approach. For the thematic approach, processing logic may classify, one or more keywords of the first title and one or more keywords from the second title and determine one or more terms from each title can be classified in a common category (e.g., refers to similar subject matter). Alternatively or in addition, processing logic may automatically classify the terms based on machine learning clustering that maximizes a distance between clusters of the terms. Once the terms have been clustered, the processing device may assign an identifier to the clusters, such as a number, and each of the terms may be assigned the identifier of the cluster to which it belongs. List having terms assigned the same identifier (e.g., of the same subject matter) can meet a similarity threshold associated with the keywords of the title.

In embodiments, processing logic determines a first sentiment classification corresponding to the first set of ranked items based on the one or more keywords of the first title. Processing logic determine a second sentiment classification corresponding to the second set of ranked items based on the one or more keywords of the second title. Process logic may further determine that the first title and the second title are within a threshold proximity based on a comparison between the first sentiment classification and the second sentiment classification.

At block 408, processing logic determines that the first set of ranked items is most similar to the second set of ranked items by performing a similarity comparison between the first set of ranked items and other sets of ranked items including the second set of ranked items. The similarity comparison can be rank weighted comparison. Processing logic may generate a vector representation for the first set and for the second set that includes each item of the current list and each item of other lists associated with one or more other users. Processing logic may determine the proximity or similarity between a first set (e.g., first feature vector) and a second set (e.g., second feature vector) using the following calculation for cosine similarity between two vectors (e.g., two sets):

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

where A may be a first vector associated with a first set (e.g., the current list) and each of the other vectors (e.g., representing other sets including the second set) being compared may be represented by B, and where $A_i$ and $B_i$ are the items of the vectors A and B (e.g., the items of the lists), respectively. Processing logic may exclude lists having title that are not within a threshold similarity (e.g., using methodology described in association with block 310).

At block 410, the processing logic provides a rank-ordered list for presentation on the user device, the rank-ordered list comprising the sets of ranked items such that the second set of ranked items is ranked above all other sets of ranked items. In some embodiments, processing logic performs one or more aspects, details, and/or features associated with block 314 of FIG. 3. In some embodiments, processing logic may send an indication of the second user account to the user device associated with the first user account.

In some embodiments, processing logic further determines (e.g., by a processing device) that the first set of ranked items correspond to a first subject matter category. Processing logic further receives third data associated with the first user profile. The third data may comprise a third set of ranked items and a third title having one or more keywords that are different than the keywords of the first title. The third set of ranked items correspond to the first subject matter category. Processing logic further identifies fourth data associated with a third user profile. The fourth data may include a fourth set of ranked items and a fourth title having one or more keywords. Processing logic further determines that the third title and the fourth title are within a threshold proximity based on a comparison between the one or more keywords of the third title and the one or more keywords of the fourth title. Processing logic further determines that the third set of ranked items is most similar to the fourth set of ranked items based on a comparison between the third set of ranked items and a second selection of one or more additional sets of ranked items that includes the third set of ranked items. Processing logic may further provide the fourth set of ranked items for presentation on the user device responsive to determining that the third set of ranked items is most similar to the fourth set of ranked items.

Figure 5:
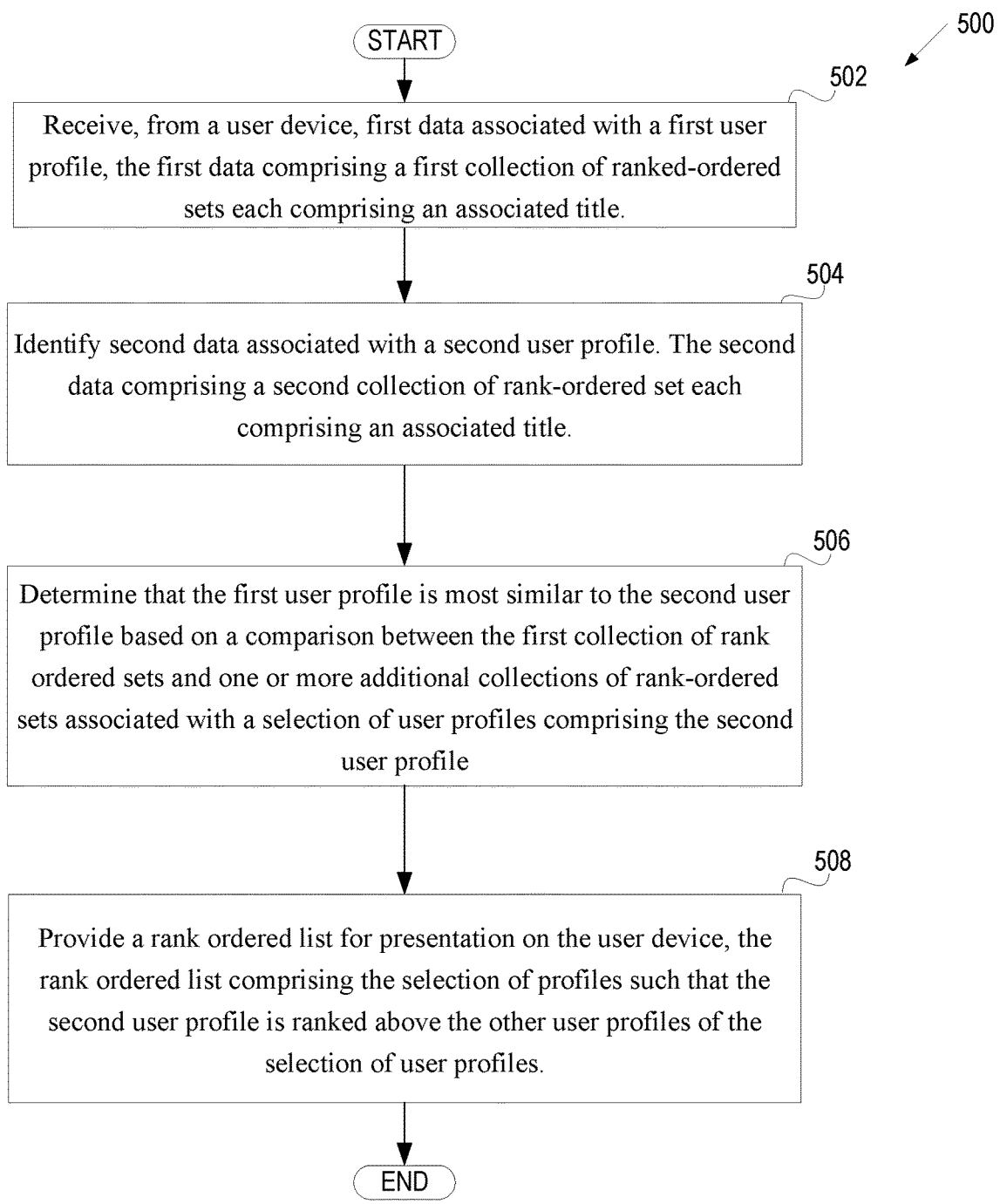
FIG. 5 depicts a flow diagram of one illustrative example of a method of matching lists, according to some embodiments.

FIG. 5 depicts a flow diagram of one illustrative example of a method 500 of matching lists, according to some embodiments. Method 500 is performed by processing logic that can include hardware (circuitry, dedicated logic, etc.), software (such as is run on a general purpose computer system or a dedicated machine), firmware, or some combination thereof. In one implementation, method 500 can be performed by a computer system, such as computer system architecture 100 of FIG. 1. In other or similar implementations, one or more operations of method 500 can be performed by one or more other machines not depicted in the figures.

At block 502, processing logic receives, from a user device, first data associated with a first user profile, the first data comprising a first collection of ranked-ordered set each comprising an associated title. The first user profile may include one or more features, aspects, and/or details of user profile 202 of FIG. 2.

At block 504, processing logic identifies second data associated with a second user profile. The second data comprising a second collection of rank-ordered set each comprising associated title. The first user profile may include one or more features, aspects, and/or details of user profile 216 of FIG. 2.

At block 506, processing logic determines that the first user profile is most similar to the second user profile based on a comparison between the first collection of rank-ordered sets and one or more additional collections of rank-ordered sets associated with a selection of user profiles comprising the second user profile. The comparison between the first collection and the one or more additional collections may include a rank weighted similarity comparison of one or more sets of the first collection and one or more sets of each of the one or more additional collections. In some embodiments, the rank weighted similarity comparison comprises a cosine similarity comparison. For example, processing logic may leverage one or more aspects, features, and/or details associated with block 408.

In some embodiments, each title of the first collection of rank-ordered sets includes one or more keywords and each title of the second collection of rank-ordered sets include one or more keywords. Processing logic may further determine a plurality of similarity metrics each corresponding to a comparison between the one or more keywords of an associated title for each for each of the first collection of rank-ordered sets with the one or more keywords of an associated title for each of the second collection of rank-ordered sets. Processing logic may further aggregate the plurality of similarity metrics to determine a total similarity metric. Processing logic may further determine that user profiles that do not meet a threshold title similarity may be excluded from further processing.

In some embodiments, processing logic may further determine a first plurality of sentiment classification (e.g., "best", "worst", "greatest", etc.) each corresponding to one of the first collection of rank-ordered sets based on an associated title. Processing logic may further determine a second plurality of sentiment classification each corresponding to one of the second collection of rank-ordered set based on an associated title. The first collection and second collection are within a threshold proximity further based on a similarity between one or more of the first plurality of sentiment classifications and one or more of the second plurality of sentiment classifications.

In some embodiments, processing logic determine a plurality of user similarity metrics corresponding to a similarity between the first user profile and each of the selection of user profiles. Determining that the first user profile is most similar to the second user profile may be further based on the plurality of user similarity metrics.

In some embodiments, processing logic may determine a first set similarity metric between a first set of the first collection of rank-ordered sets and a first set of the second collection of rank-ordered sets by determining an item similarity metric between each item of the first set of the first collection of rank-ordered sets and each item of the first set of the second collection of rank-ordered sets. The item similarity metric may be determined in view of rank-order for each item of the first set of the first collection and the first set of the second collection. Processing logic may further aggregate the item similarity metrics for each combination of items of the first set of the first collection of rank-ordered sets and the first set of the second collection of rank-ordered sets.

In some embodiments, processing logic determine a first similarity metric between a first user profile and a second user profile by determining a set similarity metric between each of the first collection of rank-ordered set and each of the second collection of rank-ordered sets. Processing logic further aggregates the set similarity metrics for each combination of sets of the first collection of rank-ordered sets and the second collection of rank-ordered sets.

At block 508, processing logic provides a rank-ordered list for presentation on the user device. The rank-ordered list comprising the selection of profiles such that the second user profile is ranked above the other user profiles of the selection of user profiles. The rank-ordered list may comprise the user profiles (e.g., including collection of sets of ranked items) such that a second user profile that is determined to be the most similar is ranked above all user profiles. In some embodiments, the rank-ordered list is presented to the user in rank order using a similarity metric (e.g., user similarity metric or "matchmeasure"). In some embodiments, the lists are presented to the user with a visual indicator representing the user similarity metric associated with user profile. For example, one or more user profiles with the highest similarity metric may be depicted with first color (e.g., green or gold) and one or more user profiles with a similarity metrics close to a first threshold level may be depicted with a second color (e.g., yellow or silver). In some embodiments, the user profiles may be placed in tiers or groups based on the associated confidence levels.

Figure 6:
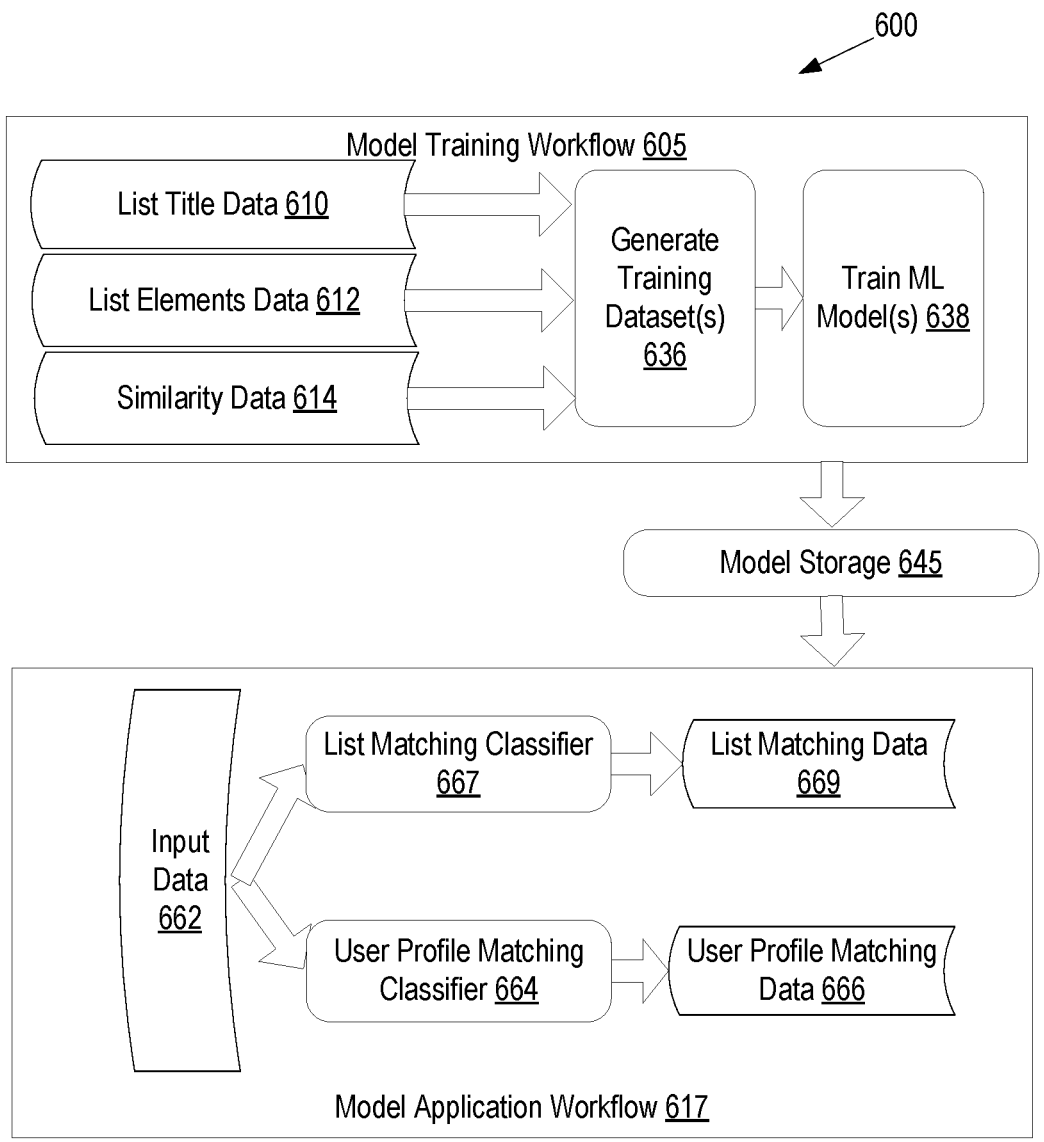
FIG. 6 illustrates a model training workflow and a model application workflow for list and/or user profile matching, according to aspects of the disclosure.

FIG. 6 illustrates a model training workflow 605 and a model application workflow 617 for list and/or user profile matching, according to aspects of the disclosure. In embodiments, the model training workflow 605 may be performed at a server which may or may not include a list and/or user profile matching application, and the trained models are provided to a process result prediction application, which may perform the model application workflow 617. The model training workflow 605 and the model application workflow 617 may be performed by processing logic executed by a processor of a computing device (e.g., server 120 of FIG. 1). One or more of these workflows 605, 617 may be implemented, for example, by one or more machine learning modules implemented processing device and/or other software and/or firmware executing on a processing device.

The model training workflow 605 is to train one or more machine learning models (e.g., regression models, boosted regression models, principal component analysis models, deep learning models) to perform one or more determining, predicting, modifying, etc. tasks associated with a process result predictor (e.g., critical dimension predictions, film thickness predictions). The model application workflow 617 is to apply the one or more trained machine learning models to perform the determining and/or tuning, etc. tasks for user profile matching.

Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained machine learning (ML) model is a single shared neural network that has multiple shared layers and multiple higher level distinct output layers, where each of the output layers outputs a different prediction, classification, identification, etc. The tasks that the one or more trained machine learning models may be trained to perform are as follows:

a. List Matching Classifier—The list matching classifier obtains a set of ranked items and determines a similarity (e.g., using a similarity metric) between the set and one or more additional sets of ranked items. The list matching classifier may identify relative similarities in similarities between sets of ranked items. The list matching classifier may leverage a rank-based comparison algorithm (e.g., cosine similarity) to determine a similarity of the current list with each of the list identified as having a similar sentiment and title. The list matching classifier may output the similar lists starting with the list most similar to through the list least similar.

b. User Profile Matching Classifier—The user profile matching obtains a current user profile and one or more lists of the current user profile. The user profile matching classifier may aggregate all resulting list identified as similar to one or more lists of the current user profile. The user profile matching classifier determines a count of the number of lists each user has in common with the current user. For each list of each identified user, the user profile matching classifier compares the similarity of the items in each list using a rank-based similarity comparison (e.g., cosine similarity) to obtain a set similarity metric between each list. Set similarity metrics may be aggregated for a given user comparison combination to determine a user to user similarity metric. The user profile matching classifier may return or otherwise output a list of user profiles ordered by the user to user similarity metric (e.g., most similar to least similar).

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine learning models is a recurrent neural network (RNN). An RNN is a type of neural network that includes a memory to enable the neural network to capture temporal dependencies. An RNN is able to learn input-output mappings that depend on both a current input and past inputs. The RNN will address past and future sensor and/or process result measurements and make predictions based on this continuous metrology information. RNNs may be trained using a training dataset to generate a fixed number of outputs (e.g., list similarity metrics and/or user profile similarity metrics). One type of RNN that may be used is a long short term memory (LSTM) neural network.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset.

For the model training workflow 605, a training dataset containing hundreds, thousands, tens of thousands, hundreds of thousands or list title data 610 (e.g., keywords and sentiments), list elements data 612 (e.g., rank-ordered elements within one or more lists) and/or similarity data 614 (e.g., similarity metrics for lists combinations and user profile combinations) should be used to form a training dataset. This data may be processed to generate one or multiple training datasets 636 for training of one or more machine learning models. The machine learning models may be trained, for example, to automate user and/or list matching associated with list title data 610 and list elements data 612.

To effectuate training, processing logic inputs the training dataset(s) 636 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of list title data 610 (e.g., keywords and sentiments), list elements data 612 (e.g., rank-ordered elements within one or more lists) and/or similarity data 614 (e.g., similarity metrics for lists combinations and user profile combinations) into the machine learning model one at a time. The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce.

Accordingly, the output may include one or more predictions or inferences. For example, an output prediction or inference may include one or more rank-ordered lists identifying similar lists and/or similar profiles to a target list and/or user profile, respectively. Processing logic determines an error (i.e., a classification error or prediction error) based on the difference between the predicted process results and measured processed results (e.g., user input identifying which lists and/or user profiles are to be identified as the most similar). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criterion is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

Once one or more trained machine learning models 638 are generated, they may be stored in model storage 645, and may be added to a substrate process rate determination and/or process tuning application. Substrate process rate determination and/or process tuning application may then use the one or more trained ML models 638 as well as additional processing logic to implement an automatic mode, in which user manual input of information is minimized or even eliminated in some instances.

For model application workflow 617, according to one embodiment, input data 662 (e.g., a current set of ranked elements or list) may be input to list matching classifier 667, which may include a trained machine learning model. Based on the input data 662, list matching classifier 667 outputs information indicating a one or more sets of ranked elements being similar to a target or current set of ranked items (e.g., list matching data 669). According to one embodiment, input data 662 (e.g., a current user profile and associated rank-ordered lists) may be input to user profile matching classifier 664, which may include a trained machine learning model. Based on the input data 662, user profile matching classifier 667 outputs information indicating one or more user profile having one or more sets of ranked elements being similar to a target or current set of ranked items (e.g., user profile matching data 666).

FIGS. 7-12 illustrate exemplary user interfaces (UI) 700-1200 of a profile matching system user interface, according to some embodiments. Each exemplary user interface 700-1200 may be displayed on one or more computing and/or process devices 702-1202 (e.g., user device 112 of FIG. 1).

Figure 7:
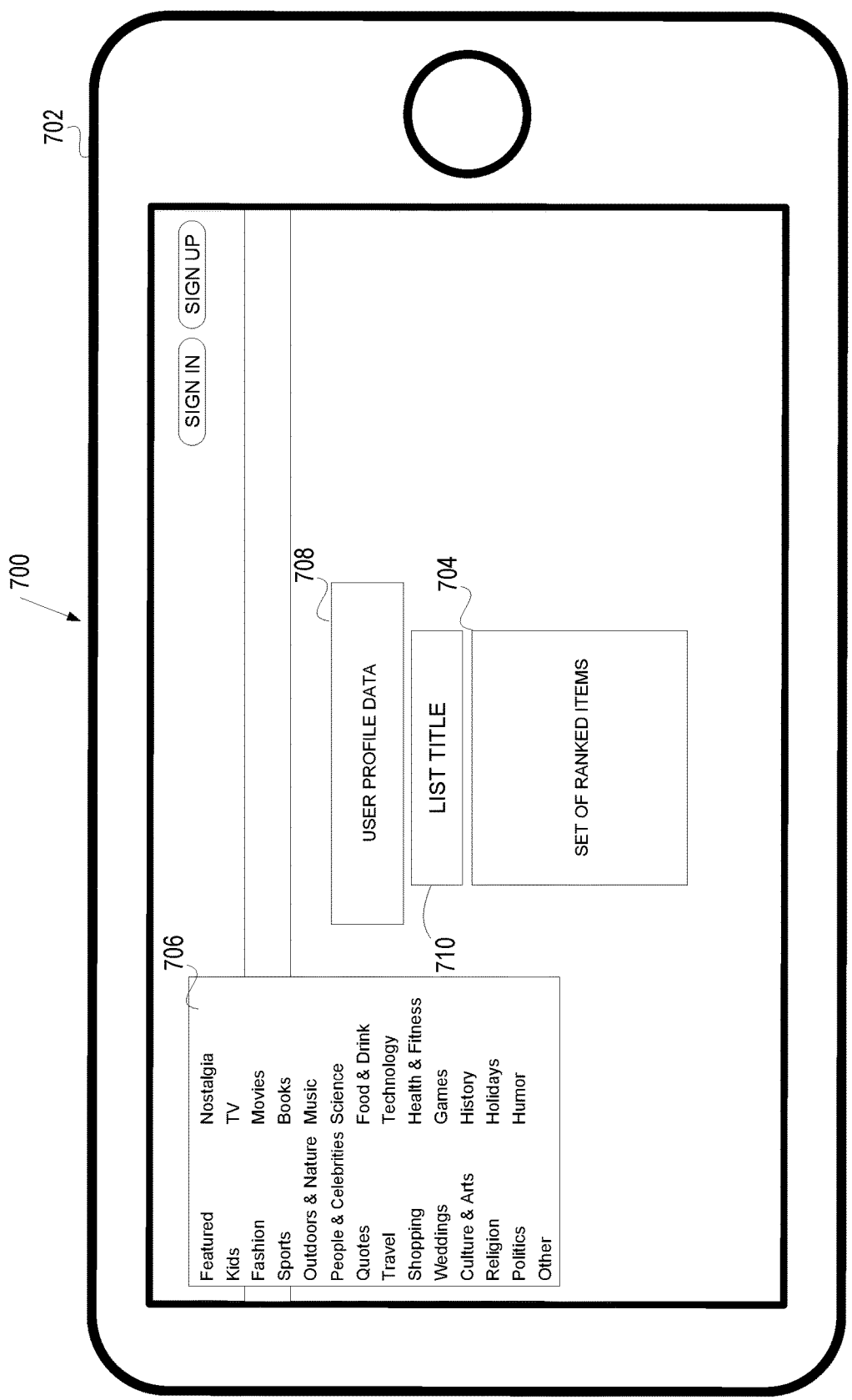
FIGS. 7-12 illustrate exemplary user interfaces (UI) 700-1200 of a profile matching system user interface, according to some embodiments.

FIG. 7 illustrates an example category list 706 associated with ranked ordered list elements 706. The UI 700 may display user profile data 708 and a list 704 (e.g., set of ranked elements) associated with a user profile. The UI may include a title 710 associated with the list 704.

Figure 8:
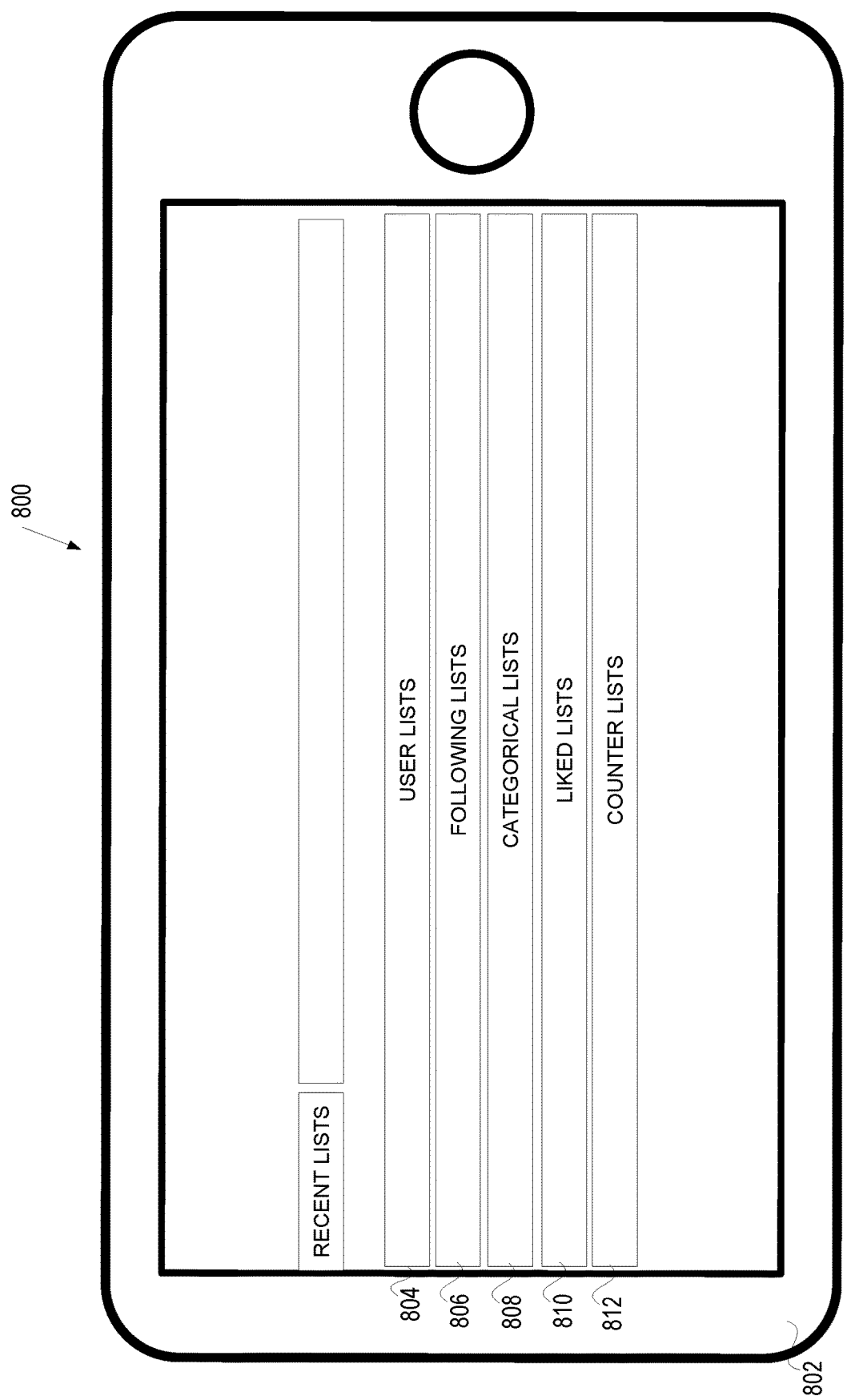

FIG. 8 illustrates an exemplary UI 800 including one or more UI elements 804-812 displayed on a processing device 802. UI element 804 may be associated with tracking, viewing, editing, matching, and/or otherwise interacting with one or more lists corresponding to a user profile. UI element 806 may be associated with tracking, viewing, editing, matching, and/or otherwise interacting with lists connected to a user profile (e.g., followed lists, friend lists, matched lists, etc.). UI element 808 may be associated with tracking, viewing, editing, matching, and/or otherwise interacting with one or more lists of in one or more categories associate with a user profile. UI element 810 may be associated with tracking, viewing, editing, matching, and/or otherwise interacting with one or more lists indicated by a user profile to be of interest (e.g., "like"). UI element 812 may be associated with tracking, viewing, editing, matching, and/or otherwise interacting with one or more counters (e.g., having different sentiment) to one or lists associated with a user account.

Figure 9:
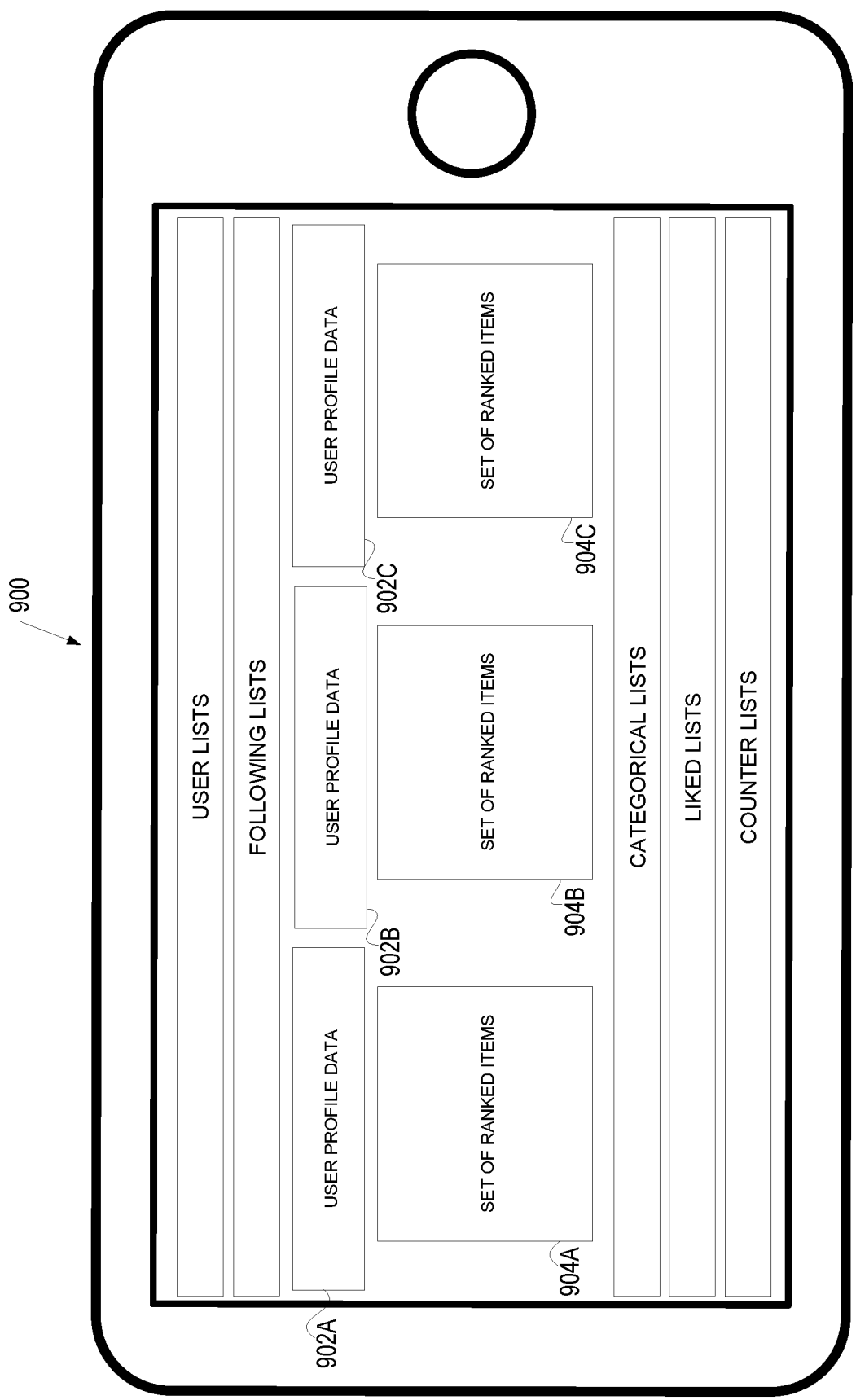

FIG. 9 illustrates an exemplary UI 900 including one or more UI elements 902A-C, 904A-C. UI elements 902A-C indicate one or more user profiles. UI elements 904A-C indicate one or more lists associated with the one or more user profiles. The one or more lists may be associated with one or more lists associated with a current user profile (e.g., associated with UI element 806.

Figure 10:
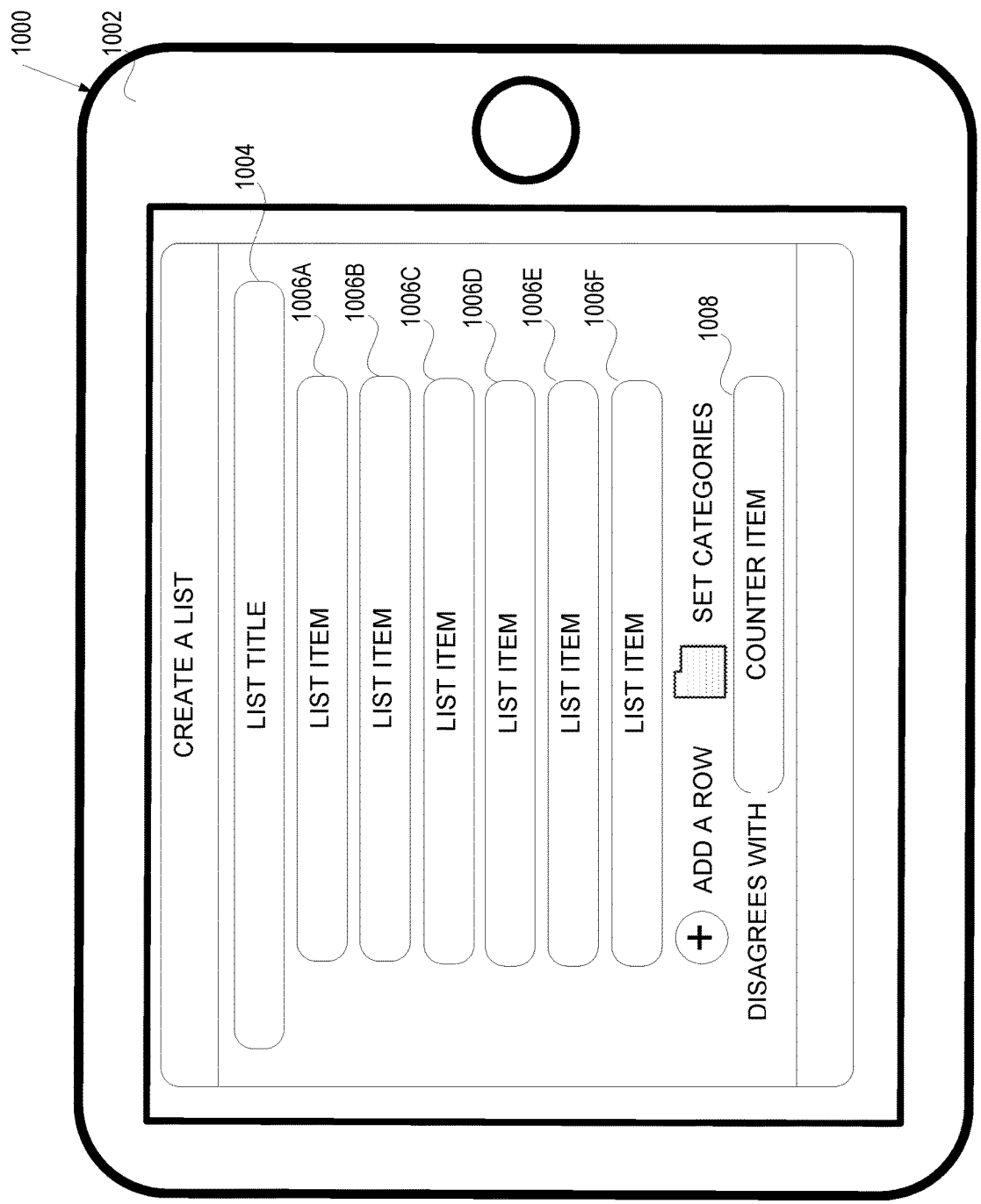

FIG. 10 illustrates an exemplary UI 1000 including a one or more elements for list management associated with a user account. The UI 1000 may include one or more fields 1004 associated with tracking, viewing, editing, matching, and/or otherwise interacting with a title of a title to be created. The UI 1000 may include one or more fields 1006 associated with tracking, viewing, editing, matching, and/or otherwise interacting with one or more rank-ordered of a list. In some embodiments, the UI 1000 may include one or more fields 1008 associated with elements of the list that counter or otherwise disagrees with the list element in one or more fields 1006.

Figure 11:
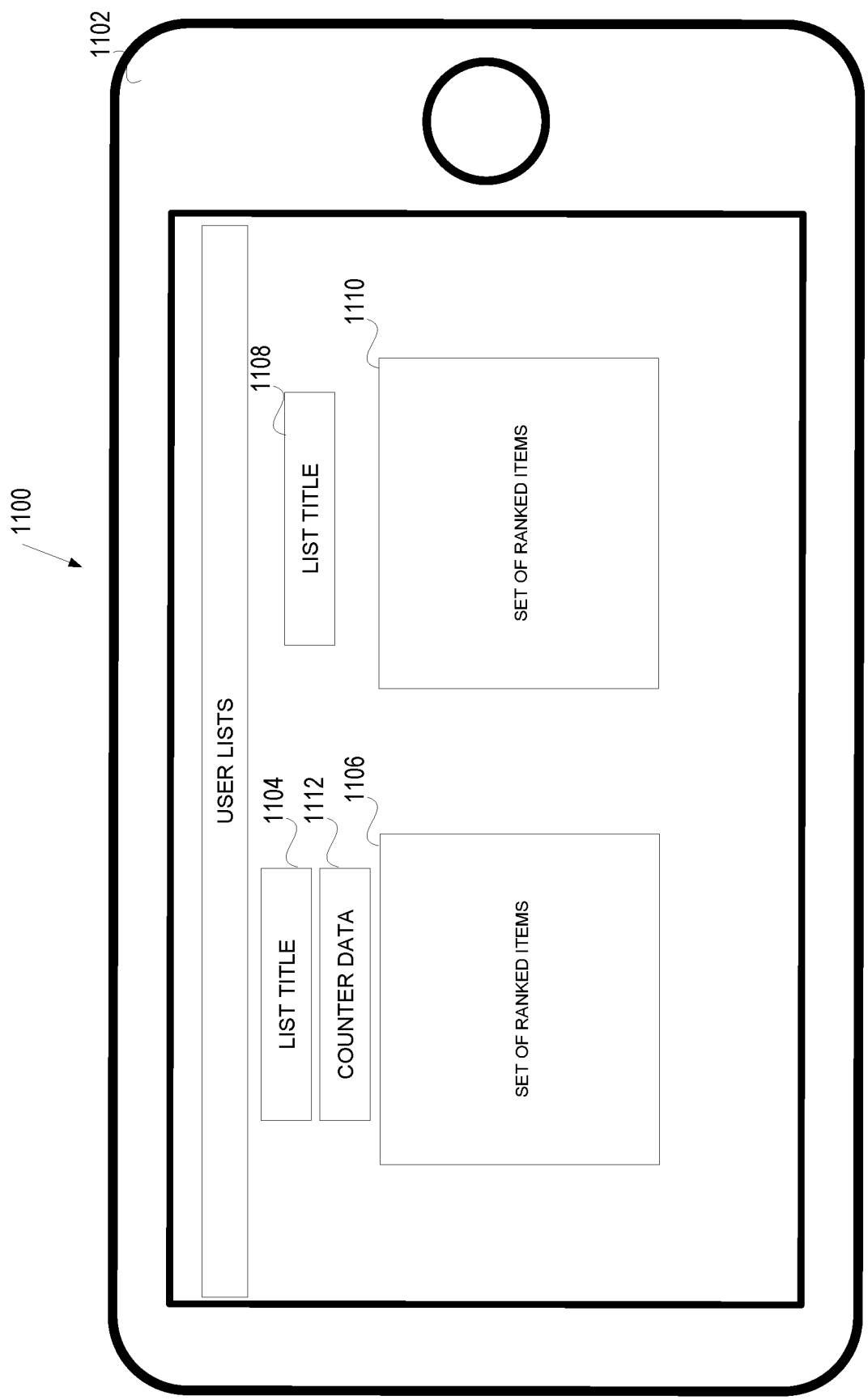

FIG. 11 illustrates an exemplary UI 1100 including a one or more UI elements 1104, 1106, 1108, 1110 for list management associated with a user account. UI elements 1104, 1108 may include one or more title to lists corresponding to a user account. UI elements 1106, 1110 may include one or more rank-ordered lists corresponding to the user account and associated with UI elements 1104, 1108. The UI elements 1112 may include counter data associated with elements of the list that counter or otherwise disagrees with the list element corresponding to UI elements 1106.

Figure 12:
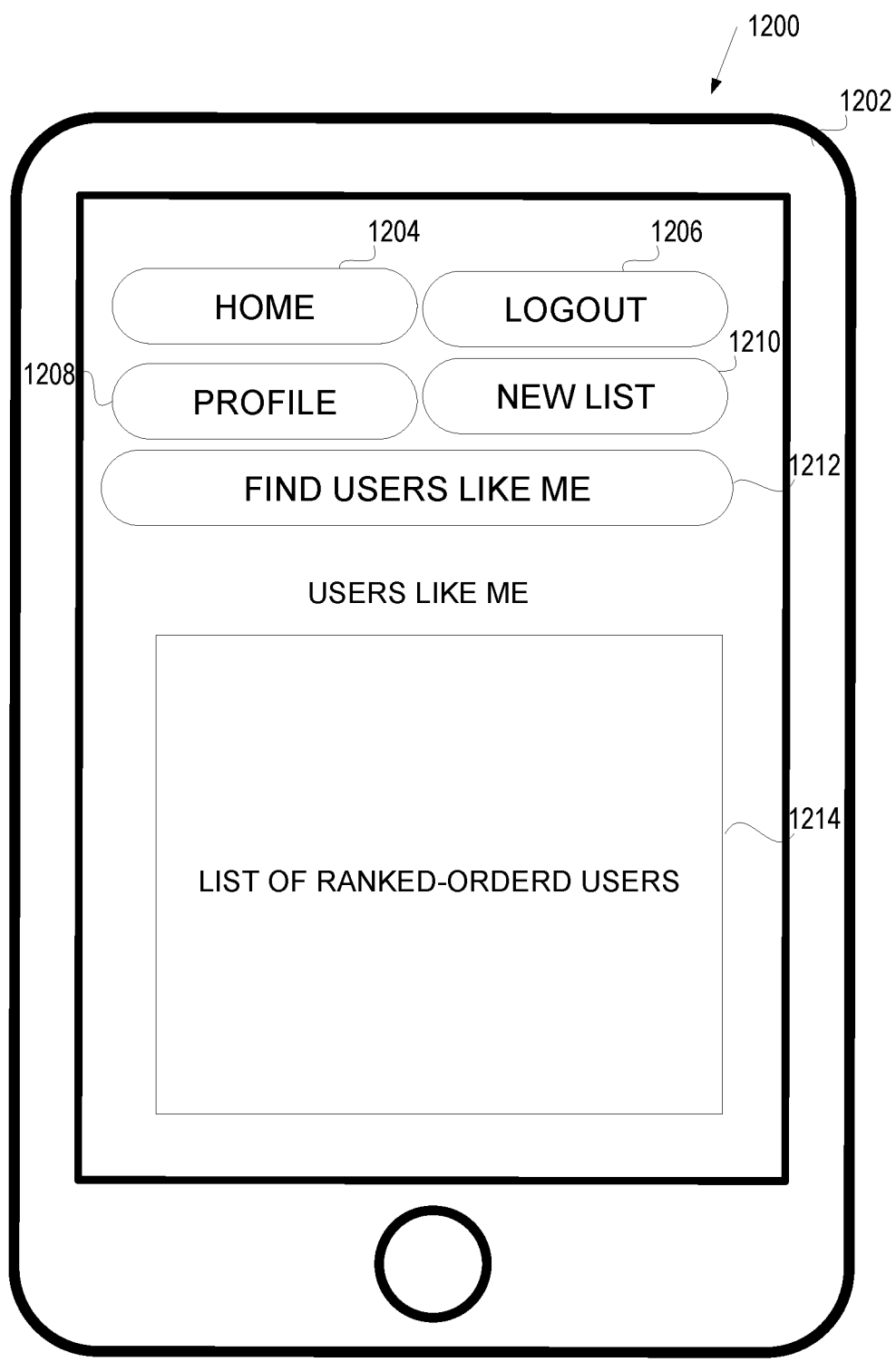

FIG. 12 illustrates an exemplary UI 1200 including one or more UI elements 1104, 1106, 1108, 1110, 1112. UI elements 1104, 1108 may be associated tracking, viewing, editing, matching, and/or otherwise interacting with user profile data (e.g., a user profile module). UI element 1106 may be associated with logging a user out of an application (e.g., an application performing one or more methods and/or features described features). US element 1110 is associated with generating a new list. For example, interacting with UI element 1110 may display an UI including one or more features, details, and/or elements associated with UI 1000A-B. UI element 1114 may include a list of rank-ordered user (e.g., an output and/or result of profile-matching tool 134 of FIG. 1).

Figure 13:
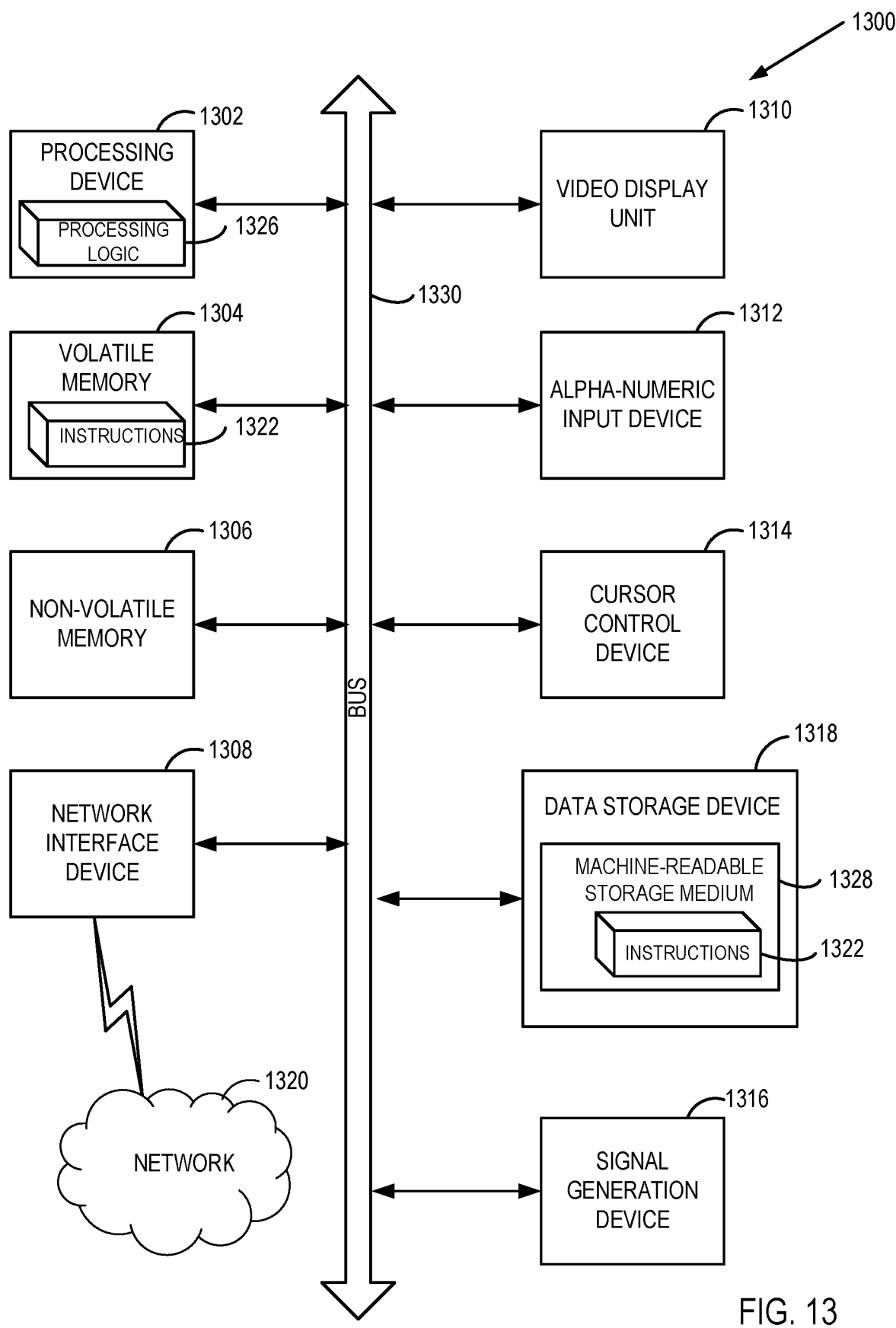
FIG. 13 depicts a block diagram of an example computing device 1300, operating in accordance with one or more aspects of the present disclosure.

FIG. 13 depicts a block diagram of an example computing device 1300, operating in accordance with one or more aspects of the present disclosure. In various illustrative examples, various components of the computing device 1300 may represent various components of the user devices 112, server 120, data store 140, and machine learning system 170, illustrated in FIG. 1.

Example computing device 1300 may be connected to other computer devices in a LAN, an intranet, an extranet, and/or the Internet. Computing device 1300 may operate in the capacity of a server in a client-server network environment. Computing device 1300 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 1300 may include a processing device 1302 (also referred to as a processor or CPU), a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1318), which may communicate with each other via a bus 1330.

Processing device 1302 represents one or more general-purpose processing devices such as a microprocessor, central processing unit, or the like. More particularly, processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1302 may be configured to execute instructions implementing methods 300-500 illustrated in FIGS. 3-5.

Example computing device 1300 may further comprise a network interface device 708, which may be communicatively coupled to a network 1320. Example computing device 1300 may further comprise a video display 1310 (e.g., a liquid crystal display (LCD), a touch screen, or a cathode ray tube (CRT)), an alphanumeric input device 1312 (e.g., a keyboard), a cursor control device 1314 (e.g., a mouse), and an acoustic signal generation device 1316 (e.g., a speaker).

Data storage device 1318 may include a machine-readable storage medium (or, more specifically, a non-transitory machine-readable storage medium) 1328 on which is stored one or more sets of executable instructions 1322. In accordance with one or more aspects of the present disclosure, executable instructions 1322 may comprise executable instructions associated with executing methods 300-500 illustrated in FIGS. 3-5.

Executable instructions 1322 may also reside, completely or at least partially, within main memory 1304 and/or within processing device 1302 during execution thereof by example computing device 1300, main memory 1304 and processing device 1302 also constituting computer-readable storage media. Executable instructions 1322 may further be transmitted or received over a network via network interface device 1308.

While the computer-readable storage medium 1328 is shown in FIG. 13 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a processing device from a user device, first data associated with a first user profile, the first data comprising a first set of ranked items and a first title having one or more keywords comprising a first topic keyword and a first sentiment keyword;
identifying, by the processing device, second data associated with a second user profile, the second data comprising a second set of ranked items and a second title having one or more keywords comprising a second topic keyword and a second sentiment keyword;
determining that the first title and the second title are within a threshold proximity based on a comparison between the first topic keyword and the second topic keyword, and further based on a comparison between the first sentiment keyword and the second sentiment keyword, wherein the comparison between the first topic keyword and the second topic keyword comprises:
providing the first topic keyword and second topic keyword as inputs to a machine learning model, and
obtaining one or more outputs of the machine learning model indicating that the first topic keyword and the second topic keyword both correspond to the same topic cluster;
training, by the processing device, a second machine learning model for determining an overall similarity between a plurality of sets of ranked items, wherein the training uses a training dataset comprising similarity data of a plurality of training sets of ranked items, wherein the similarity data comprises a plurality of similarity metrics for respective pairs of training sets of the plurality of training sets of ranked items, and wherein the training further uses a training loss function that indicates an error based on user input identifying which training sets of ranked items are to be identified as the most similar;
determining, by the processing device, that the first set of ranked items is most similar to the second set of ranked items based on an application of the second machine learning model to the first set of ranked items and one or more additional sets of ranked items comprising the second set of ranked items, wherein the application of the second machine learning model comprises:
providing the first set of ranked items and the one or more additional sets of ranked items as inputs to the second machine learning model, and
obtaining one or more outputs of the second machine learning model indicating that the first set of ranked items is most similar to the second set of ranked items; and
responsive to determining that the first set of ranked items is most similar to the second set of ranked items, providing, by the processing device, the first set of ranked items for presentation on the user device.

2. The method of claim 1, wherein the plurality of similarity metrics comprises a cosine similarity comparison.

3. The method of claim 1, further comprising:
providing a rank-ordered list for presentation on the user device, the rank-ordered list comprising a selection of the additional sets of ranked items such that the second set of ranked items is ranked above other sets of the selection of the additional sets of ranked items.

4. The method of claim 1, further comprising:
sending, to the user device, an indication of a second user profile corresponding to the second set of ranked items.

5. The method of claim 1, further comprising:
determining, by the processing device, that the first set of ranked items correspond to a first subject matter category;
receiving third data associated with the first user profile, the third data comprising a third set of ranked items and a third title having one or more additional keywords not included in the first title, wherein the third set of ranked items correspond to the first subject matter category;
identifying, by the processing device, fourth data associated with a third user profile, the fourth data comprising a fourth set of ranked items and a fourth title having one or more keywords;
determining, by the processing device, that the third title and the fourth title are within a threshold proximity based on a comparison between the one or more keywords of the third title and the one or more keywords of the fourth title;
determining, by the processing device, that the third set of ranked items is most similar to the fourth set of ranked items based on a comparison between the third set of ranked items and a second selection of one or more additional sets of ranked items comprising the fourth set of ranked items; and
responsive to determining that the third set of ranked items is most similar to the fourth set of ranked items, providing, by the processing device, the fourth set of ranked items for presentation on the user device.

6. The method of claim 1, wherein the first set of ranked items is a rank-ordered list, wherein a rank of the first set of ranked items is based on an order of the ranked items within the first set of ranked items, the method further comprising:
assigning an associated weight to each of the first set of ranked items based on the order of the ranked items within the first set of ranked items.

7. A method, comprising:
receiving, by a processing device from a user device, first data associated with a first user profile, the first data comprising a first collection of rank-ordered sets each comprising an associated title comprising a respective first topic keyword and a respective first sentiment keyword;
identifying, by the processing device, second data associated with a second user profile, the second data comprising a second collection of rank-ordered sets each comprising an associated title comprising a respective second topic keyword and a respective second sentiment keyword, wherein the first collection and the second collection are within a threshold proximity based on a similarity between one or more respective first topic keywords associated with the sets of the first collection and one or more respective second topic keywords associated with the sets of the second collection, and further based on a similarity between one or more respective first sentiment keywords associated with the sets of the first collection and one or more respective second sentiment keywords associated with the sets of the second collection, and wherein the similarity between the one or more first respective topic keywords and the one or more second respective topic keywords is based on a machine learning clustering operation comprising:

providing a first topic keyword of the one or more first respective topic keywords and a second topic keyword of the one or more second respective topic keywords as inputs to a machine learning model, and obtaining one or more outputs of the machine learning model indicating that the first topic keyword and the second topic keyword both correspond to the same topic cluster;

training, by the processing device, a second machine learning model for determining an overall similarity between a plurality of sets of ranked items, wherein the training uses a training dataset comprising similarity data of a plurality of training sets of ranked items, wherein the similarity data comprises a plurality of similarity metrics for respective pairs of training sets of the plurality of training sets of ranked items, and wherein the training further uses a training loss function that indicates an error based on user input identifying which training sets of ranked items are to be identified as the most similar;

determining, by the processing device, that the first user profile is most similar to the second user profile based on an application of the second machine learning model to the first collection of rank-ordered sets and one or more additional collections of rank-ordered sets associated with a selection of user profiles comprising the second user profile, wherein the application of the second machine learning model comprises:

providing a first set of ranked items of the first collection of rank-ordered sets and one or more additional sets of ranked items of the one or more additional collections of rank-ordered sets as inputs to the second machine learning model, and obtaining one or more outputs of the second machine learning model indicating that the first set of ranked items is most similar to a second set of ranked items associated with the second collection of rank-ordered sets; and responsive to determining that the first user profile is most similar to the second user profile, providing, by the processing device, the second user profile for presentation on the user device.

8. The method of claim 7, wherein the plurality of similarity metrics comprises a cosine similarity comparison.

9. The method of claim 7, further comprising:
determining a plurality of similarity metrics each corresponding to a comparison between the respective first topic and sentiment keywords of an associated title for each of the first collection of rank-ordered sets with the respective second topic and sentiment keywords of an associated title for each of the second collection of rank-ordered sets;
aggregating the plurality of similarity metrics to determine a total similarity metric; and
determining that the total similarity metric meets a threshold condition.

10. The method of claim 7, further comprising:
responsive to determining that the first user profile is most similar to the second user profile, providing, by the processing device, a rank-ordered list for presentation on the user device, the rank-ordered list comprising the selection of user profiles such that the second user profile is ranked above other user profiles of the selection of user profiles.

11. The method of claim 7, further comprising:
determining a plurality of user similarity metrics corresponding to a similarity between the first user profile and each of the selection of user profiles, wherein determining that the first user profile is most similar to the second user profile is further based on the plurality of user similarity metrics.

12. The method of claim 11, further comprising:
determining a first user similarity metric between the first user profile and the second user profile by:
determining a set similarity metric between each of the first collection of rank-ordered sets and each of the second collection of rank-ordered sets; and
aggregating the set similarity metric for each combination of sets of the first collection of rank-ordered sets and the second collection of rank-ordered sets.

13. The method of claim 12, further comprising:
determining a first set similarity metric between a first set of the first collection of rank-ordered sets and a first set of the second collection of rank-ordered set by:
determining an item similarity metric between each item of the first set of the first collection of rank-ordered sets and each item of the first set of the second collection of rank-ordered sets, wherein the item similarity metric is determined in view rank-order of each item of the first set of the first collection of rank-ordered sets and the first set of the second collection of rank-ordered sets; and
aggregating the item similarity metric for each combination of items of the first set of the first collection of rank-ordered sets and the first set of the second collection of rank-ordered sets.

14. A non-transitory machine-readable storage medium comprising instructions that, when executed by a processing device, cause the processing device to:
receive, from a user device, first data associated with a first user profile, the first data comprising a first set of ranked items and a first title having one or more keywords comprising a first topic keyword and a first sentiment keyword;
identify second data associated with a second user profile, the second data comprising a second set of ranked items and a second title having one or more keywords comprising a second topic keyword and a second sentiment keyword;
determine that the first title and the second title are within a threshold proximity based on a comparison between the first topic keyword and the second topic keyword, and further based on a comparison between the first sentiment keyword and the second sentiment keyword, wherein the comparison between the first topic keyword and the second topic keyword comprises:
providing the first topic keyword and second topic keyword as inputs to a machine learning model, and
obtaining one or more outputs of the machine learning model indicating that the first topic keyword and the second topic keyword both correspond to the same topic cluster;
train a second machine learning model for determining an overall similarity between a plurality of sets of ranked items, wherein the training uses a training dataset comprising similarity data of a plurality of training sets of ranked items, wherein the similarity data comprises a plurality of similarity metrics for respective pairs of training sets of the plurality of training sets of ranked items, and wherein the training further uses a training loss function that indicates an error based on user input identifying which training sets of ranked items are to be identified as the most similar;

determine that the first set of ranked items is most similar to the second set of ranked items based on an application of the second machine learning model to the first set of ranked items and one or more additional sets of ranked items comprising the second set of ranked items, wherein the application of the second machine learning model comprises:
- providing the first set of ranked items and the one or more additional sets of ranked items as inputs to the second machine learning model, and
- obtaining one or more outputs of the second machine learning model indicating that the first set of ranked items is most similar to the second set of ranked items; and responsive to determining that the first set of ranked items is most similar to the second set of ranked items, provide the first set of ranked items for presentation on the user device.

\* \* \* \* \*